(12) United States Patent
Liu et al.

(10) Patent No.: US 11,487,596 B2
(45) Date of Patent: Nov. 1, 2022

(54) API MASHUP INFRASTRUCTURE GENERATION ON COMPUTING SYSTEMS

(71) Applicant: FUJITSU LIMITED, Kawasaki (JP)

(72) Inventors: Lei Liu, San Jose, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 43 days.

(21) Appl. No.: 17/008,128

(22) Filed: Aug. 31, 2020

(65) Prior Publication Data

US 2022/0066847 A1 Mar. 3, 2022

(51) Int. Cl.
*G06F 9/54* (2006.01)
*H04L 12/66* (2006.01)
*G06F 16/955* (2019.01)

(52) U.S. Cl.
CPC .............. *G06F 9/547* (2013.01); *G06F 9/541* (2013.01); *G06F 16/955* (2019.01); *H04L 12/66* (2013.01)

(58) Field of Classification Search
CPC ........... G06F 8/42; G06F 8/70; G06F 16/9024
See application file for complete search history.

(56) References Cited

U.S. PATENT DOCUMENTS

| | | | |
|---|---|---|---|
| 8,751,558 B2 | 6/2014 | Bleier et al. | |
| 9,069,873 B2 | 6/2015 | Kim et al. | |
| 10,191,786 B2 | 1/2019 | Liu et al. | |
| 10,430,255 B2 | 10/2019 | Liu et al. | |
| 10,528,367 B1* | 1/2020 | Liu | G06F 9/4498 |
| 10,963,625 B1* | 3/2021 | Blender | G06F 9/542 |
| 2010/0107060 A1* | 4/2010 | Ishizuka | G06Q 10/109 |
| | | | 715/255 |
| 2010/0153865 A1* | 6/2010 | Barnes | H04L 67/10 |
| | | | 715/762 |
| 2010/0257242 A1* | 10/2010 | Morris | G06F 16/958 |
| | | | 719/330 |
| 2017/0277756 A1* | 9/2017 | Masuda | G06F 9/5072 |
| 2018/0165135 A1* | 6/2018 | Bahrami | G06F 9/541 |

(Continued)

OTHER PUBLICATIONS

Gao, Wei & Chen, Liang & Wu, Jian & Gao, Honghao. (2015). Manifold-Learning Based API Recommendation for Mashup Creation. 432-439. 10.1109/ICWS.2015.64.

(Continued)

*Primary Examiner* — Mahran Y Abu Roumi
(74) *Attorney, Agent, or Firm* — Fujitsu Patent Center

(57) ABSTRACT

According to an aspect of an embodiment, operations include deploying a trigger function on a computing system for detecting an electronic trigger event associated with a first Application Programming Interface (API) provider. The operations further include deploying a rule function for applying at least one trigger rule on event data and deploying an action function for generating at least one API call to a second API provider based on whether the event data satisfies the at least one trigger rule. The operations further include deploying a set of API gateways for enabling a workflow system to invoke at least one of: the deployed trigger function, the deployed rule function, and the deployed action function. The operations further include generating a workflow template of an API mashup based on information associated with the deployed functions and API gateways and posting the generated workflow template to the workflow system.

20 Claims, 10 Drawing Sheets

(56) References Cited

U.S. PATENT DOCUMENTS

| | | | |
|---|---|---|---|
| 2018/0232444 A1 | 8/2018 | Duesterwald et al. | |
| 2018/0349179 A1* | 12/2018 | Worboys | G06Q 10/0631 |
| 2019/0196796 A1* | 6/2019 | Bahrami | G06F 8/38 |
| 2019/0384856 A1 | 12/2019 | Liu et al. | |
| 2020/0073730 A1* | 3/2020 | Jannu | G06F 9/542 |
| 2020/0301760 A1* | 9/2020 | Janakiraman | G06F 8/36 |
| 2020/0401465 A1* | 12/2020 | Douglas | G16H 40/00 |
| 2021/0004407 A1* | 1/2021 | Huang | G06F 16/2471 |
| 2021/0056138 A1* | 2/2021 | Greene | G06F 16/907 |
| 2021/0089278 A1* | 3/2021 | Dunn | G05B 19/05 |
| 2021/0306336 A1* | 9/2021 | Exton | H04L 63/101 |

OTHER PUBLICATIONS

Xue, Qinghan & Liu, Lei & Chen, Weipeng & Chuah, Mooi Choo. (2017). Automatic Generation and Recommendation for API Mashups. 119-124. 10.1109/ICMLA.2017.0-169.

Elena L. Glassman, Tianyi Zhang, Björn Hartmann, and Miryung Kim. 2018. Visualizing API Usage Examples at Scale. In Proceedings of the 2018 CHI Conference on Human Factors in Computing Systems (CHI '18). Association for Computing Machinery, New York, NY, USA, Paper 580, 1-12. DOI:https://doi.org/10.1145/3173574.3174154.

Website: API Harmony (https://apiharmony-open.mybluemix.net/public) [obtained Aug. 31, 2020].

Website: ProgrammableWeb (https://www.programmableweb.com/) [obtained Aug. 31, 2020].

\* cited by examiner

API MASHUP INFRASTRUCTURE GENERATION ON COMPUTING SYSTEMS

CROSS-REFERENCE TO RELATED APPLICATIONS/INCORPORATION BY REFERENCE

This Application makes reference to U.S. application Ser. No. 15/929,878, titled "Automatic Code Generation For API Mashups," which was filed on May 27, 2020. The above stated Patent Application is hereby incorporated herein by reference in its entirety.

FIELD

The embodiments discussed in the present disclosure are related to generation of application programming interface (API) mashup infrastructure on, e.g., cloud computing systems.

BACKGROUND

Many companies and organizations offer web APIs for several applications, such as speech processing and social media analysis. With rapid rise in number of APIs, there has been a rise in demand for API mashups and infrastructure for execution of such API mashups. An API mashup typically combines the functionality of several APIs into a new service. API mashups are used in all kinds of businesses and are generally used by companies to integrate various software into their products efficiently and inexpensively.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include deploying a trigger function on a cloud computing system for detecting an electronic trigger event associated with a first Application Programming Interface (API) provider. The operations may further include deploying a rule function on the cloud computing system for applying at least one trigger rule on event data associated with the electronic trigger event and deploying an action function on the cloud computing system for generating at least one API call to a second API provider based on whether the event data satisfies the at least one trigger rule. The operations may further include deploying a set of API gateways on the cloud computing system for enabling a workflow system to invoke at least one of: the deployed trigger function, the deployed rule function, and the deployed action function. The operations may further include generating a workflow template of an API mashup on the cloud computing system based on information associated with the deployed set of API gateways and each of the deployed trigger function, the deployed rule function, and the deployed action function. The operations may further include posting the generated workflow template to the workflow system for a workflow execution of the API mashup.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

all according to at least one embodiment described in the present disclosure.

DESCRIPTION OF EMBODIMENTS

Some embodiments described in the present disclosure relate to a method and a non-transitory computer-readable medium for generation of an application programming interface (API) mashup infrastructure on a cloud computing system. The present disclosure further relates to a setup and execution of an API mashup by use of the generated API mashup infrastructure on cloud computing systems. The infrastructure prevents a need for a developer to manually code various sections (trigger, rule, action) of the API mashup. Conventional platforms rely on a specialist that can code and set up an API mashup in an on-premise network or in a cloud network. This strategy often takes a longer deployment life cycle.

In recent years, IF-This-Then-That (IFTTT) mashups have becoming more and more popular. Many conventional platforms provide such services, which allow users to create workflows with "triggers" and "actions" by using Web APIs. However, the number of IFTTT mashup recipes in such platforms increases much slower than the growth of Web APIs. This is because human effort may still largely be required to build and deploy IFTTT mashup recipes on such platforms. Although significant progress has been made, there are no solutions which focus on generating executable API mashup recipes. The present disclosure discloses a method to automatically generate IFTTT mashup infrastructure, to enable automatic creation, deployment, and execution of API mashups, such as IFTTT mashups. By using various APIs, an end-to-end IFTTT mashup can be created, deployed, and executed in a few minutes on top of a cloud computing system. Considering the fact that the number of Web APIs increases very quickly over time, the disclosed method may greatly reduce the development cycle and cost for setting up and executing IFTTT API mashups.

According to one or more embodiments of the present disclosure, the time taken to deploy an API mashup may be improved by configuring a mashup installer which automatically creates, deploys, and executes the API mashups, with little to no need of a specialist. The present disclosure may also incur low development cycle and cost during the generation new API's mashups. Therefore, the present disclosure may save the efforts and time of the specialist, previously required in generation, deployment, and execution of an API mashup. The mashup installer may provide multiple REST APIs, which may automatically generate triggers, rules, and actions of an API mashup on the cloud computing system and create a workflow XML to describe the API mashup by connecting the triggers, rules, and actions. The workflow XML may be automatically posted to a workflow system to set up and execute the API mashup.

Embodiments of the present disclosure are explained with reference to the accompanying drawings.

Figure 1:
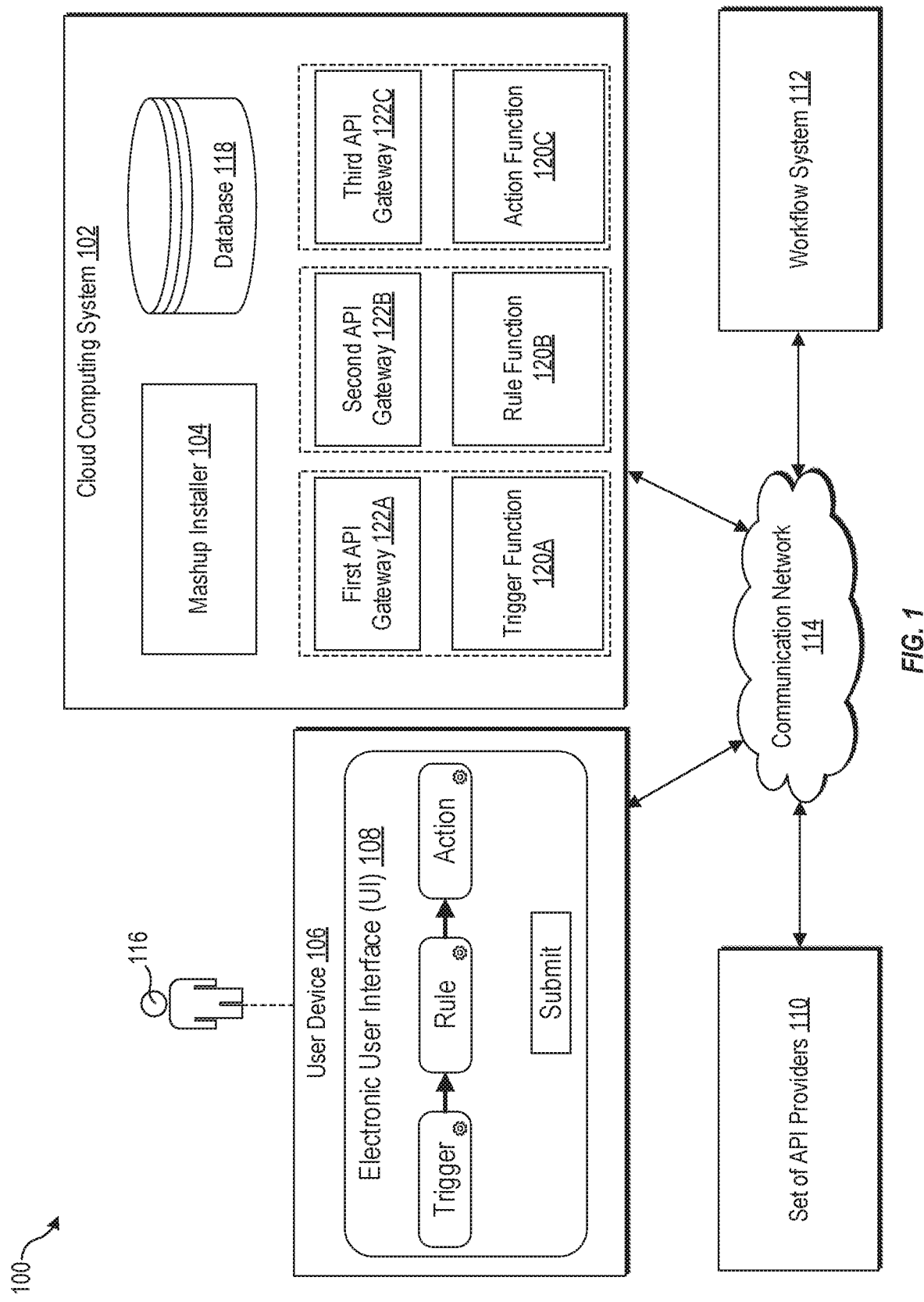
FIG. 1 is a diagram representing an example environment related to generation of an API mashup infrastructure on a cloud computing system.

FIG. 1 is a diagram representing an example environment related to generation of an API mashup infrastructure on a cloud computing system, arranged in accordance with at least one embodiment described in the present disclosure. With reference to FIG. 1, there is shown an example environment 100. In the example environment 100, there is shown a cloud computing system 102 and a mashup installer 104 that may be deployed on the cloud computing system 102. There is further shown a user device 106 and an electronic user interface (UI) 108 rendered onto a display screen of the user device 106. With reference to FIG. 1, there is further shown a set of API providers 110, a workflow system 112, and a communication network 114. The cloud computing system 102, the user device 106, the set of API providers 110, and the workflow system 112 may be communicatively coupled to each other, via the communication network 114.

There is further shown a user 116 who may be associated with the user device 106. Examples of the user device 106 may include, but are not limited to, a mobile device, a desktop computer, a laptop, a computer workstation, a server, such as a cloud server, or a group of servers. In one or more embodiments, the user device 106 may include a user-end terminal device and a server communicatively coupled to the user-end terminal device. Examples of the user-end terminal device may include, but are not limited to, a mobile device, a desktop computer, a laptop, or a computer workstation.

The cloud computing system 102 may include suitable logic, circuitry, and interfaces that may be configured to provide cloud computing resources and various services that use such resources to setup and execute API mashups on the cloud computing system 102. Such cloud computing resources may be distributed across one or more availability zones (e.g., datacenters) and within one or more geographic regions. Examples of the cloud computing resources may include, but are not limited to, a pool of virtual-machines, a block storage, a file or object storage, firewalls, API gateways, load balancers, virtual local area networks (VLANs), containers, hardware or software load balancers, code libraries, functions, and associated software bundles, and one or more storage volumes. These and other cloud computing resources (if any) may collectively define a cloud-based computing environment that may facilitate the mashup installer 104 and other cloud services to deploy and execute code(s), host software application(s), store data, and otherwise utilize the computing resources. The cloud-based computing environment may be provided atop an infrastructure of various computing resources that allow the computing environment to be defined, modified, and otherwise tailored according to the needs of the user 116.

The mashup installer 104 may be a computer-executable application or an event-triggered service that may be deployed on the cloud computing system 102. The mashup installer 104 may be configured to provide an end-to-end solution for automatic generation and deployment of API mashups on the cloud computing system 102.

The mashup installer 104 may be configured to receive a sequence of inputs which may include, for example, API calls from the electronic UI 108 on the user device 106. Such inputs may be generated on the user device 106 based on a user selection of a set of user-selectable options, such as an API-based trigger option, a trigger rule, and an API-based action via the electronic UI 108 of the user device 106. Such options may be presented on the electronic UI 108 to allow the user 116 to compose a trigger, a rule, and an action component of an API mashup. An example of such selection is provided, for example, in FIG. 3.

In an embodiment, the mashup installer 104 may receive a first input which includes a selection of the API-based trigger option associated with a first API provider. The API-based trigger option may correspond to an endpoint of an API associated with the first API provider. Additionally, in some cases, the mashup installer 104 may receive a set of trigger parameters associated with the API-based trigger option. For example, if the first API provider is a messaging service provider, then the API-based trigger option may correspond to an endpoint to retrieve a message posted on a messaging platform associated with the messaging service provider. A trigger parameter may include a username, or a user identifier associated with the message. In this example, when the message satisfying the trigger parameter may be posted on the messaging platform, an electronic trigger event may be detected. The message may be referred to as event data. The electronic trigger event may be associated with the event data, which may be used to detect the electronic trigger event.

The mashup installer 104 may generate a computer-executable trigger code for detecting the electronic trigger event based on the received first input and the received set of trigger parameters. The mashup installer 104 may deploy a trigger function 120A on the cloud computing system 102. The deployed trigger function 120A may include the generated computer-executable trigger code as a first function setting of the trigger function 120A. The trigger function 120A may be deployed for detection of the electronic trigger event associated with the first API provider of the set of API providers 110.

In an embodiment, the mashup installer 104 may further receive a second input via the electronic UI 108 of the user device 106. The second input may include a selection of the at least one trigger rule, applicable on the event data associated with the API-based trigger option. Additionally, in some cases, the mashup installer 104 may receive a set of rule parameters associated with the at least one trigger rule. For example, if the event data in the foregoing example is a message posted on the messaging platform, then a trigger rule may include a rule pattern, such as "USA" and a rule operator as "includes". The rule pattern may be matched in the event data based on the rule operator defined in the trigger rule. By using the trigger rule, it may be checked whether the message posted on the messaging platform includes "USA". Details of trigger rules are further provided, for example, in FIG. 3.

The mashup installer 104 may generate a computer-executable rule code based on the received second input and the set of rule parameters. The mashup installer 104 may further deploy a rule function 120B on the cloud computing system 102. The rule function 120B may include the generated computer-executable rule code as a function setting of the deployed rule function 120B. The rule function 120B may be deployed for application of at least one trigger rule on the event data associated with the electronic trigger event.

The mashup installer 104 may receive a third input via the electronic UI 108 of the user device 106. The third input may include a selection of an API-based action associated with a second API provider of the set of API providers 110. The API-based action may be configured to be performed based on whether the event data satisfies a selected trigger rule. Additionally, in some cases, the mashup installer 104 may receive a set of action parameters associated with the API-based action. For example, if the second API provider is a second messaging service provider different from the first messaging service provider, then the API-based action may be selected as an endpoint which may post a notification on a messaging platform associated with the second messaging service provider. An action parameter may include a username, or a user identifier associated with the messaging platform. In this example, if the event data satisfies a trigger rule (which includes a rule pattern, such as "USA" and a rule operator as "includes"), then an API-based action may include posting of a notification to a user associated with the username or the user identifier in the action parameter. An example of API-based actions is further provided, for example, in FIG. 3.

The mashup installer 104 may generate a computer-executable action code based on the received third input and the received set of action parameters. The mashup installer 104 may deploy an action function 120C on the cloud computing system 102. The action function 120C may include the generated computer-executable action code as a function setting of the action function 120C. The action function 120C may be deployed for generating at least one API call to the second API provider of the set of API providers 110 based on whether the event data satisfies the at least one trigger rule.

In an embodiment, the mashup installer 104 may also deploy a set of API gateways 122A, 122B, and 122C on the cloud computing system 102. The deployment of the set of API gateways 122A, 122B, and 122C may include integration of a first API gateway 122A, a second API gateway 122B, and a third API gateway 122C with the trigger function 120A, the rule function 120B, and the action function 120C, respectively. Each of the set of API gateways 122A, 122B, and 122C may be deployed as a service to filter and route incoming requests to a respective function on the cloud computing system 102. Each of the set of API gateways 122A, 122B, and 122C may also enable a secure access to respective functions on the cloud computing system 102, with appropriate authentication and authorization controls.

The set of API gateways 122A, 122B, and 122C may enable the workflow system 112 to invoke at least one of: the deployed trigger function 120A, the deployed rule function 120B, and the deployed action function 120C. Such functions may be invoked in a specific order for an execution of the API mashup on the cloud computing system 102. In an embodiment, each of the set of API gateways 122A, 122B, and 122C may provide a uniform resource locator (URL), to which payload (such as HTTP payload) may be delivered from a pre-configured webhook server or an API provider. For example, if the trigger function 120A is configured as a webhook listener, then a webhook service may be configured using the URL of the first API gateway 122A, to transmit a webhook message with the event data to the URL of the first API gateway 122, whenever an electronic trigger event is detected. The first API gateway 122A may receive the webhook message and may invoke the webhook listener synchronously with an event, which may contain a representation of the webhook message.

The mashup installer 104 may collect information associated with the deployed set of API gateways 122A, 122B, and 122C and each of the deployed trigger function 120A, the deployed rule function 120B, and the deployed action function 120C. In an embodiment, the collected information may be stored in a database 118.

The database 118 may be implemented, for example, as a relational database with a defined schema or a non-relational database, such as a NoSQL (Structured Query Language) database that supports key-value and document data structures. In an embodiment, the database 118 may be a cloud database which may be accessible as-a-service on the cloud computing system 102.

Based on the collected information, the mashup installer 104 may generate a workflow template of the API mashup on the cloud computing system 102. The workflow template may be generated in a structured data format, such as, but not limited to, JavaScript Object Notation (JSON), Yet Another Markup Language (YAML), or Extensible Markup Language (XML) format. The workflow template may describe a workflow sequence to execute the API mashup by individually invoking the trigger function 120A, the rule function 120B, and the action function 120C. Details about the generation of the workflow template are provided, for example, in FIG. 8.

The mashup installer 104 may post the generated workflow template to the workflow system 112 for a workflow execution of the API mashup. The workflow system 112 may include suitable logic, circuitry, interfaces, or code that may be configured to control the workflow execution of the API mashup on the cloud computing system 102 based on the posted workflow template. In an embodiment, for such control, the workflow system 112 may be implemented as a low-code or a no-code platform, which may read the workflow template to individually invoke the trigger function 120A, the rule function 120B, and the action function 120C on the cloud computing system 102. The workflow system 112 may act as an orchestrator for the workflow execution of the API mashup after respective functions and API gateways are deployed on the cloud computing system 102. Example implementations of the workflow system 112 may include, but are not limited to, a web server, a cloud server, a container, or a virtual machine, or a BareMetal server. Details about the workflow execution of the API mashup are provided, for example, in FIG. 10.

It should be noted that the communication between the cloud computing system 102, the user device 106, the set of API providers 110, and the workflow system 112 may be performed via one or more communication networks, such a via the communication network 114. The communication network 114 may include a communication medium through which the cloud computing system 102 may communicate with the user device 106, the set of API providers 110, the workflow system 112 and/or different devices (not shown). Examples of the communication network 114 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to mashup installer 104 in the cloud computing system 102, without departing from the scope of the present disclosure.

Figure 2:
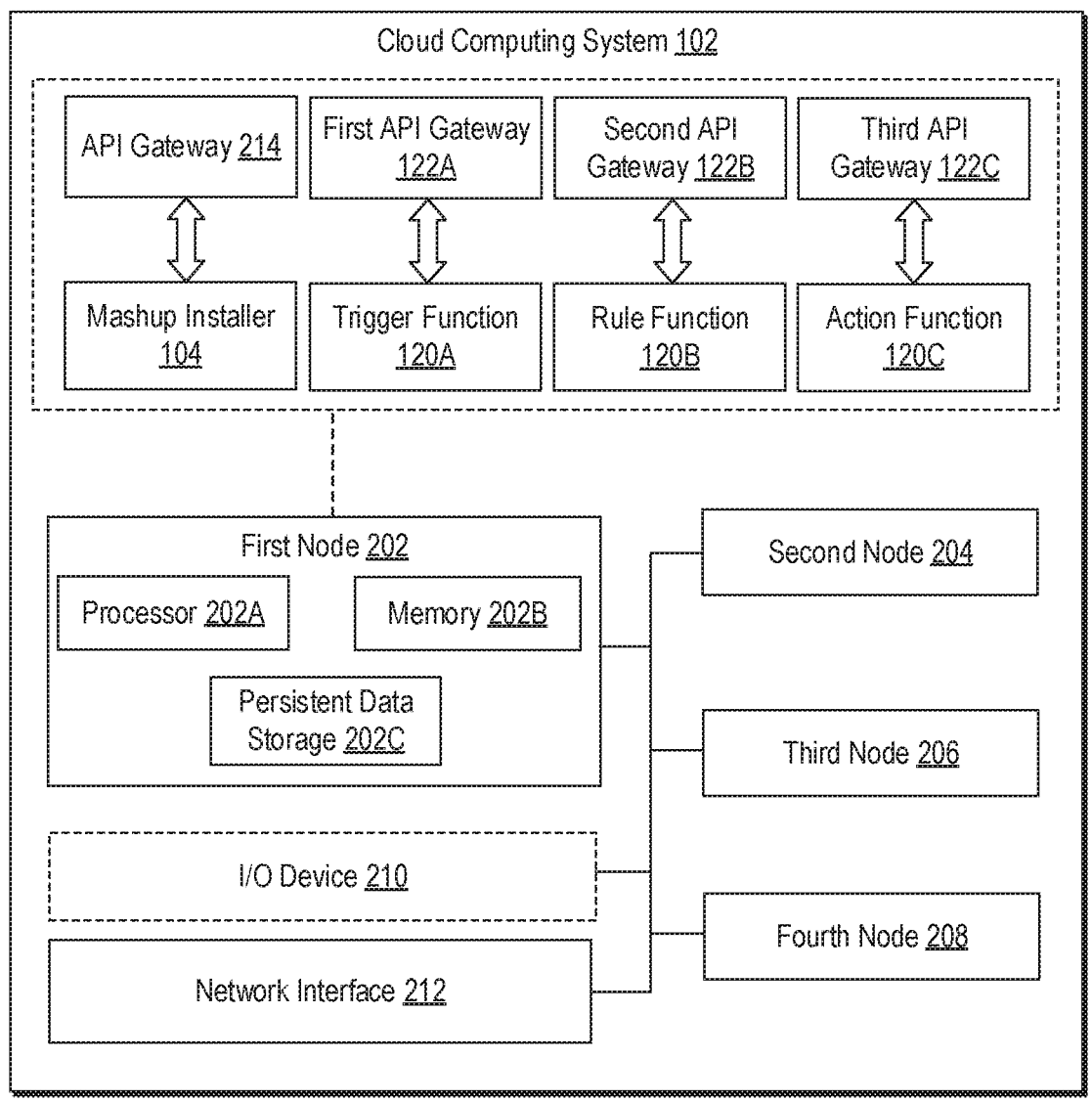
FIG. 2 is a block diagram of the cloud computing system of FIG. 1.

FIG. 2 is a block diagram of the cloud computing system of FIG. 1, arranged in accordance with at least one embodiment described in the present disclosure. FIG. 2 is explained in conjunction with elements from FIG. 1. With reference to FIG. 2, there is shown a block diagram 200 of the cloud computing system 102 of FIG. 1.

The cloud computing system 102 may provide a set of computing resources. Such resources may be accessible from server nodes or clusters spread across one or more geographic regions. Each geographic region may encompass a geographic area in which one or more physically separate data centers may be located. For example, such regions may include United States South (i.e., US-South), US-East, European Union Great Britain (i.e., EU-GB), EU-Germany, and Asia Pacific North (i.e., AP-North), among other possibilities. Different cloud computing systems may implement a different set of regions. Allocating computing resources within a particular geographic region allows client devices within or nearby the region to more quickly communicate with the computing resources therein.

With reference to FIG. 2, the cloud computing system 102 is shown to include a group of nodes, such as a first node 202, a second node 204, a third node 206, and a fourth node 208. The number of nodes in FIG. 2 are merely shown as an example and should not be construed as limiting for the disclosure. The present disclosure may be applicable to more or lesser number of nodes on the cloud computing system 102.

In an embodiment, the group of nodes may include one or more compute nodes, each of which may provide ephemeral storage, networking, memory, and processing resources to be consumed by a virtual machine or a container on the cloud computing system 102. Any virtual machine or container on the cloud computing system 102 may be matched to a compute node with available resources. It may be possible to host multiple VMs or containers on a single compute node, until all of its resources are consumed. It may also be possible to migrate VMs or containers from one compute node to another compute node.

In an embodiment, each of the group of nodes may represent a virtualized physical server in one or more datacenters associated with the cloud computing system 102. Specifically, each node may host one or more virtual machines (or "VMs") or containers. The VM may be an emulated computer system that may be created using a virtualization software. The VM may use the resources of a host system (i.e. the physical server), such as the CPU, RAM, and disk storage, but may be isolated from other software(s) executing on the host system (such as the physical server).

The container may be a form of operating system virtualization that may be used to run anything from a small microservice or a software process to a larger application. The container may include all the necessary executables, binary code, libraries, and configuration files. The container may share the same operating system kernel as of the host system (such as the physical server) and may isolate the application processes from the rest of the host system (such as the physical server). Therefore, the container may be more lightweight and portable as compared to the virtual machines.

Operations of the mashup installer 104, the trigger function 120A, the rule function 120B, the action function 120C, and the set of API gateways 122A, 122B, and 122C may be performed by at least one node, such as the first node 202 of the group of nodes. The first node 202 may include a processor 202A, a memory 202B, and/or a persistent data storage 202C. The cloud computing system 102 may also include an input/output (I/O) device 210 and a network interface 212 to enable communication among various computing entities, such as the group of nodes, the user device 106, and the workflow system 112.

The processor 202A may include suitable logic, circuitry, and/or interfaces that may be configured to execute program instructions associated with different operations to be executed by the first node 202. The processor 202A may include any suitable special-purpose or general-purpose computer, computing entity, or processing device, including various computer hardware or software modules, and may be configured to execute instructions stored on any applicable computer-readable storage media. For example, the processor 202A may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202A may include any number of processors configured to, individually or collectively, perform or direct performance of any number of operations of the mashup installer 104, as described in the present disclosure. Additionally, one or more of the processors may be present on one or more electronic devices, such as different servers.

In some embodiments, the processor 202A may be configured to interpret and/or execute program instructions and/or process data stored in the memory 202B and/or the persistent data storage 202C. In some embodiments, the processor 202A may fetch program instructions from the persistent data storage 202C and load the program instructions in the memory 202B. After the program instructions are loaded into memory 202B, the processor 202A may execute the program instructions. Some of the examples of the processor 202A may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 202B may include suitable logic, circuitry, and/or interfaces that may be configured to store program instructions executable by the processor 202A. In certain embodiments, the memory 202B may be configured to store information associated with one or more trigger option identifiers, one or more rule operators, and one or more action identifiers. In certain embodiments, the memory 202B may be configured to store different types of rule operators that may be included in the trigger rules. The memory 202B may include computer-readable storage media for carrying or having computer-executable instructions or data structures stored thereon. Such computer-readable storage media may include any available media that may be accessed by a general-purpose or special-purpose computer, such as the processor 202A.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202A to perform a certain operation or group of operations associated with the mashup installer 104.

The persistent data storage 202C may include suitable logic, circuitry, and/or interfaces that may be configured to store program instructions executable by the processor 202A. The persistent data storage 202C may include computer-readable storage media for carrying or having computer-executable instructions or data structures stored thereon. Such computer-readable storage media may include any available media that may be accessed by a general-purpose or special-purpose computer, such as the processor 202A.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202A to perform a certain operation or group of operations associated with the mashup installer 104.

The I/O device 210 may include suitable logic, circuitry, interfaces, and/or code that may be configured to receive a user input. The I/O device 210 may be further configured to provide an output in response to the user input. The I/O device 210 may include various input and output devices, which may be configured to communicate with the processor 202A and other components, such as the network interface 212. Examples of the input devices may include, but are not limited to, a touch screen, a keyboard, a mouse, a joystick, and/or a microphone. Examples of the output devices may include, but are not limited to, a display device and a speaker.

The network interface 212 may include suitable logic, circuitry, interfaces, and/or code that may be configured to establish a communication among the user device 106, the workflow system 112, and the group of nodes of the cloud computing system 102, via the communication network 114. The network interface 212 may be implemented by use of various known technologies to support wired or wireless communication of the mashup installer 104, via the communication network 114. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

With reference to FIG. 2, there is further shown the trigger function 120A, the rule function 120B, the action function 120C, the first API gateway 122A, the second API gateway 122B, and the third API gateway 122C. Each of the trigger function 120A, the rule function 120B, the action function 120C, the first API gateway 122A, the second API gateway 122B, and the third API gateway 122C may be deployed in one or more containers on the cloud computing system 102.

In another embodiment, the mashup installer 104 may be deployed on a container or VM associated with one of the group of nodes. The mashup installer 104 may be integrated with an API gateway 214, which may receive and route API calls and other requests to or from the mashup installer 104. For example, the API gateway 214 may receive inputs, such as API calls from the electronic UI 108 to deploy functions, such as the trigger function 120A, the rule function 120B, and the action function 120C, or to delete such deployed functions.

It should be noted the mashup installer 104, the API gateway 214, the trigger function 120A, the rule function 120B, the action function 120C, the first API gateway 122A, the second API gateway 122B, and the third API gateway 122C are shown to be associated with the first node 202. However, the disclosure may not be so limiting, and in some embodiments, the mashup installer 104, the API gateway 214, the trigger function 120A, the rule function 120B, the action function 120C, the first API gateway 122A, the second API gateway 122B, and the third API gateway 122C may be associated with any node in the group of nodes.

In some embodiments, the one or more containers may be associated with the first node 202. In such an implementation, the first node 202 may be a VM and the one or more containers may be hosted on top of the VM. In another embodiment, the one or more containers may be communicatively coupled to the first node 202 via an internal network inside the cloud computing system 102.

Although, the first node 202 is shown to include the processor 202A, the memory 202B, and the persistent data storage 202C. Each of the second node 204, the third node 206, and the fourth node 208 may also include a processor, a memory, and a persistent data storage, the description of which is omitted from the disclosure for the sake of brevity.

In FIG. 1, the functions or operations executed by any entity of the cloud computing system 102, such as the mashup installer 104, may be performed by the processor 202A of the first node 202. Operations executed by the processor 202A are described in detail, for example, in FIG. 3, FIG. 4, FIG. 5, FIG. 6, FIG. 7, FIG. 8, FIG. 9, and FIG. 10.

The cloud computing system 102 is merely an example implementation of a computing system and should not be construed as limiting for the disclosure. Operations of the cloud computing system 102, as described in FIGS. 1, 3, 4, 5, 6, 7, 8, 9, and 10, may be performed by any other suitable implementation of the computing system, without a deviation from the scope of the disclosure. For example, the computing system may be an on-premise compute server, a remote computing server, a virtualization system, or a decentralized and distributed ledger.

Modifications, additions, or omissions may be made to the cloud computing system 102 without departing from the scope of the present disclosure. For example, in some embodiments, the cloud computing system 102 may include any number of other components that may not be explicitly illustrated or described.

Figure 3:
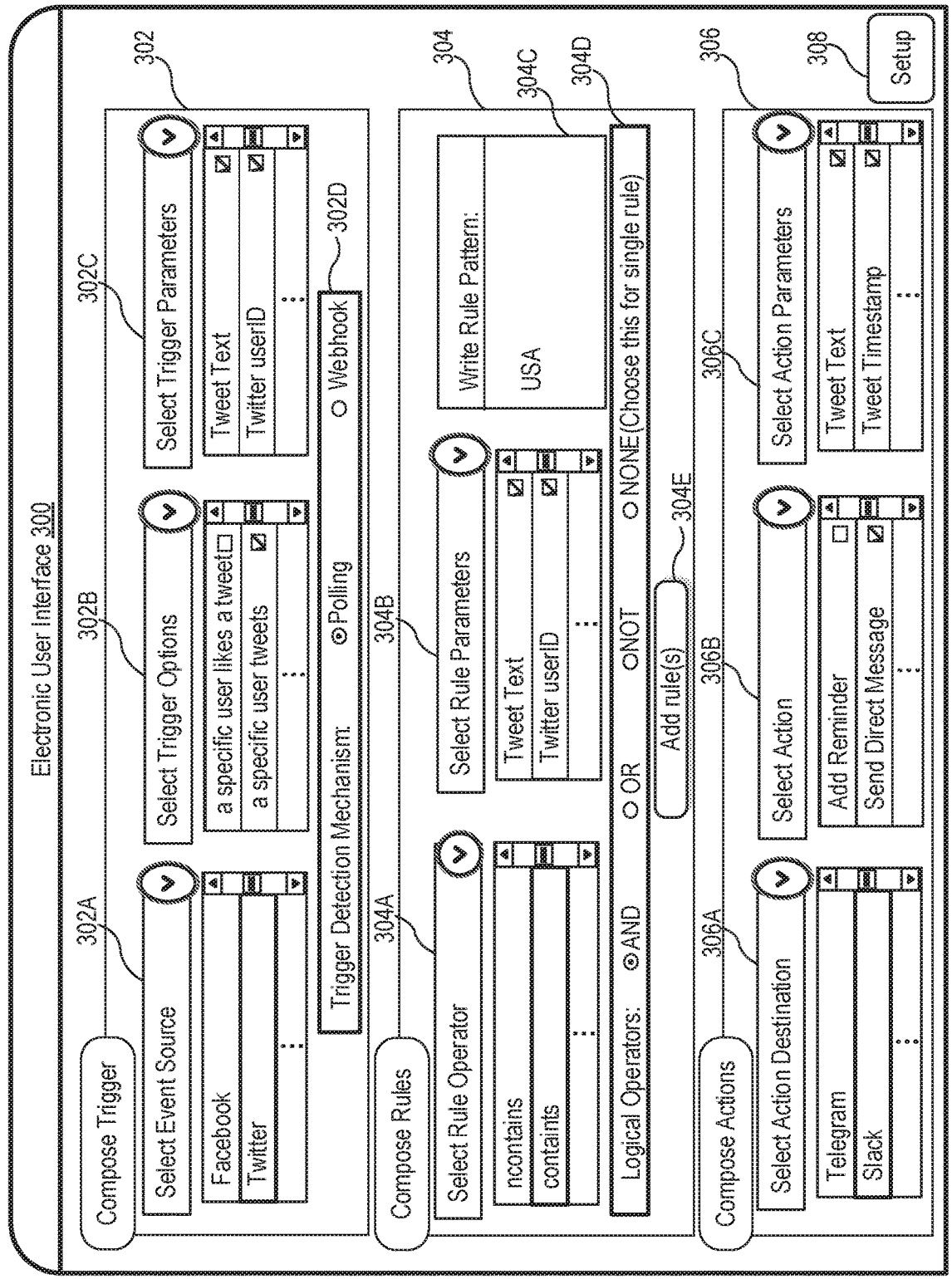
FIG. 3 is a diagram that illustrates an example electronic user interface for providing input(s) for generation of an API mashup infrastructure on a cloud computing system.

FIG. 3 is a diagram that illustrates an example electronic user interface for providing input(s) for generation of an API mashup infrastructure on a cloud computing system, according to at least one embodiment described in the present disclosure. FIG. 3 is explained in conjunction with elements from FIG. 1 and FIG. 2. With reference to FIG. 3, there is shown an electronic UI 300, which is an example implementation of the electronic UI 108 of FIG. 1. The electronic UI 300 may be displayed on the user device 106 based on a user request for setting up a trigger component of the API mashup. The electronic UI 300 may be an exemplary implementation of the electronic UI 108 and may be part of an application software, for example, a composite application software, a software development kit (SDK), a cloud server-based application, a web-based application, an OS-based application/application suite, an enterprise application, or a mobile application for API mashup generation.

On the electronic UI 300, there is shown a set of UI elements, such as a first UI element 302, a second UI element 304, a third UI element 306, and a fourth UI element 308 related to the API mashup. Initially, the first UI element 302 may be enabled for editing and all the other UI elements may be disabled for editing. The second UI element 304 may be enabled for editing based on a user input for setting up the trigger rule of the API mashup. The third UI element 306 may be enabled for editing based on a user input for setting up the API-based action of the API mashup. Similarly, the fourth UI element 308 may be enabled for selection based on a user input for setting up the API mashup.

In FIG. 3, the first UI element 302 is labelled as, for example, "Compose Triggers". The first UI element 302 may include an event source menu 302A, a trigger options menu 302B, a trigger parameter menu 302C, and a trigger detection mechanism menu 302D. Through the event source menu 302A, the trigger options menu 302B, the trigger parameter menu 302C, and the trigger detection mechanism menu 302D, a plurality of API-based trigger options may be displayed.

The event source menu 302A may be a drop-down menu, which may list the set of API providers 110 (or event sources) from which event data associated with an electronic trigger event may be received. Similarly, the trigger options menu 302B may be a drop-down menu that may display multiple trigger options, each of which may be associated with the electronic trigger event. In some embodiments, the trigger options menu 302B may allow the user 116 to select one or more trigger options, for example, via checkboxes. In one or more embodiments, if the user 116 selects a first API provider from the event source menu 302A, then the drop-down list in the trigger options menu 302B may be populated with trigger options associated with the selected first API provider. Each trigger option in the trigger options menu 302B may be referred to as an API-based trigger option and may correspond an endpoint of an API offered by an API provider. For example, if the API provider is a micro-blogging platform, such as Twitter®, then the drop-down list of the trigger options menu 302B may be populated with trigger options (i.e. natural language descriptors of various API endpoints) associated with micro-blogging platform. As explained herein, a term "xtask" refers to a particular function, which can be provided by an endpoint of an API, or any pre-built functions. Each xtask is assigned with a unique "xtask id". Each trigger option may uniquely identify a function xtask.

In one or more embodiments, instead of providing the event source menu 302A, all the options in the event source menu 302A may be combined with the trigger respective options in the trigger options menu 302B to offer a single list of trigger options. In such an implementation, the text description of a trigger option may be concatenated with the name of an API provider. For example, if the API provider is "Twitter®", and the trigger option is "Detect a new follower", the text description may be provided as "Detect a new follower on Twitter®".

Through the event source menu 302A and the trigger options menu 302B, an API-based trigger option may be selected. The trigger parameter menu 302C may be a drop-down menu that may display multiple trigger parameters associated with the selected API-based trigger option. The trigger parameter menu 302C may allow the user 116 to select a set of trigger parameters, for example, via checkboxes displayed next to such trigger parameters. The drop-down list of the trigger parameter menu 302C may be populated after the selection of the first API provider via the event source menu 302A and the selection of a trigger option via the trigger options menu 302B. In an embodiment, the set of trigger parameters may include endpoint parameters for an API endpoint selected as the API-based trigger option. In another embodiment, the trigger parameters may be extracted from API specifications (e.g., Open API Specifications) for the API endpoint(s) associated with the selected trigger options.

The trigger detection mechanism menu 302D may be a radio button menu. The user 116 may be provided with option to select a first trigger detection mechanism from a set of trigger detection mechanisms, which may include a polling-based event detection mechanism and a webhook-based event detection mechanism.

In some embodiments, the selection of the trigger detection mechanism may be based on the selection of the first API provider via the event source menu 302A. For instance, some API providers may not support a webhook-based event detection. For such API providers, the radio button for the selection of the webhook-based event detection mechanism may be disabled by default and the polling-based event detection mechanism may be selected by default. Some other API providers may support both types of trigger detection mechanisms. For such providers, the user 116 may be provided with an option to select any trigger detection mechanism from among the set of event detection mechanisms.

By way of example, and not limitation, if the first API provider is selected as Twitter®, the trigger options menu 302B may be populated with multiple trigger options, such as, but not limited to, a specific user likes a tweet, a specific user posts a new tweet, a particular hash-tag is a trending, a tweet posted from a specific geo location, or a specific user gets a new follower. The user 116 may select an API-based trigger option as 'a specific user posts a new tweet'. For the selected option, the trigger parameters may include, for example, a user ID to identify the specific user, a time or period in which new tweets may be detected, and the like. The trigger parameter(s) may be used as input parameters for API calls to a API resource server of the first API provider (such as Twitter®) to extract an API response, which may include the new tweet from the specific user and metadata, such as message ID, tweet time, tweet ID, or tweet tags. Information in the API response may be considered as the event data, which may be later on used to check whether trigger rules are satisfied, as described herein.

The second UI element 304 may be labelled as, for example, "Compose Rules" and may include a rule operator menu 304A, a rule parameter menu 304B, a rule pattern textbox 304C, a logical operator menu 304D, and an add rule(s) button 304E. Through the rule operator menu 304A, the rule parameter menu 304B, the rule pattern textbox 304C, and/or the logical operator menu 304D, and/or the add rule(s) button 304E, a plurality of trigger rules for the API mashup may be displayed.

The rule operator menu 304A may be a drop-down menu, which may list a set of pre-defined rule operators that may be applicable on the event data associated with the electronic trigger event. Examples of such rule operators with their corresponding descriptions are presented in Table 1, as follows:

TABLE 1

Different rule operators with description

| IF Rule Operator | Description |
| --- | --- |
| Equals | If trigger value equals the provided value. |
| Nequals | If trigger value does not equal the provided value. |
| Iequals | If string trigger value equals the provided value case insensitively. |
| Lessthan | If trigger value is less than the provided value. |
| Greaterthan | If trigger value is greater than the provided value. |
| NLessthan | If trigger value is not less than (equals or more than) the provided value. |
| NGreaterthan | If trigger value is not greater than (equals or less than) the provided value. |
| Matchwildcard | If trigger value matches the provided wildcard-like string. This operator provides support for Unix shell-style wildcards such as * and ?. |
| Regex | If trigger value matches the provided regular expression pattern. |
| Iregex | If trigger value matches the provided regular expression pattern case insensitively. |
| Contains | If trigger value contains the provided value. |
| Ncontains | If trigger value does not contain the provided value. |
| Icontains | If string trigger value contains the provided value case insensitively. |

TABLE 1-continued

Different rule operators with description

| IF Rule Operator | Description |
| --- | --- |
| Incontains | If string trigger value does not contain the provided string value case insensitively. |
| Starts with | If beginning of the string trigger value matches the provided string value. |
| Istartswith | If beginning of the string trigger value matches the provided string value case insensitively. |
| Endswith | If end of the string trigger value matches the provided string value. |
| Iendswith | If end of the string trigger value matches the provided string value case insensitively. |
| timediff_lt | If time difference between trigger value and current time is less than the provided value. |
| timediff_gt | If time difference between trigger value and current time is greater than the provided value. |
| timediff_nlt | If time difference between trigger value and current time is not less than the provided value. |
| timediff_ngt | If time difference between trigger value and current time is not greater than the provided value. |
| Exists | If key exists in payload. |
| Nexists | If key does not exist in payload. |
| Inside | If trigger payload is inside provided value. Reverse of contains. |
| Ninside | If trigger payload is not inside provided value. Reverse of ncontains |

The rule parameter menu 304B may be a drop-down menu that may display multiple rule parameters. The rule parameter menu 304B may allow the user 116 to select the set of rule parameter that may act as a first operand for the selected rule operator via the rule operator menu 304A. The dropdown list of the rule parameter menu 304B may be populated after the selection of the trigger parameters via the trigger parameter menu 302C. The rule pattern textbox 304C may allow the user 116 to add a rule pattern. The rule pattern may be act as a second operand for the each of the selected set of rule operators. In some embodiments, the user 116 may be provided with options to select a logical operator from the logical operator menu 304D (as represented by radio buttons). The user 116 may select the logic operator when the user 116 wants to include more than one trigger rule. The logical operator may be, for example, a logical AND, a logical OR, and the like, and may correspond to a logical operation between results of two separate trigger rules.

The user 116 may be further provided with options to add another trigger rule by clicking on the add rule(s) button 304E. Upon selection of the add rule(s) button 304E, the electronic UI 108 may display a new UI element, which may be similar to the second UI element 304. The user 116 may be again provided with options to select a rule operator, rule parameters, and a rule pattern to configure another trigger rule.

By way of example, and not limitation, the rule operator, the rule parameter, and the rule pattern for a trigger rule may be selected as 'contains', 'tweet', and 'USA', respectively, to setup a trigger rule to look up tweets (as event data) which contains the term "USA". If the trigger rule evaluates to be true, a trigger response (e.g., 1 or true) may be generated. Based on the trigger response, one or more API-based actions may be performed, as described herein. If the trigger rule evaluates to be false, no actions may be performed, and above process may be repeated until the trigger rule evaluates to be true. Through the rule operator menu 304A, the rule parameter menu 304B, the rule pattern textbox 304C, and/or the logical operator menu 304D, and/or the add rule(s) button 304E, a trigger rule may be selected by the user 116. In an embodiment, the trigger rule may uniquely identify a rule xtask. This rule xtask may define a rule pattern, a rule operator, and rule parameters.

The third UI element 306 may be labelled as, for example, "Compose Actions". The third UI element 306 may include an action destination menu 306A, an action menu 306B, and an action parameter menu 306C. Through the action destination menu 306A, the action menu 306B, the action parameter menu 306C, a plurality of API-based actions for the API mashup may be displayed. The API-based action may be selected from among the plurality of API-based actions, as displayed in the third UI element 306. In an embodiment, the API-based action may uniquely identify a function xtask. This function xtask may be provided by an endpoint of an API.

The action destination menu 306A may be a drop-down menu, which may list a set of action destinations through which an API-based action may be performed if the event data satisfies the one or more trigger rules. For example, the set of action destinations may contain a list of API providers, each of which may provide one or more API endpoints as API-based action(s). The user 116 may be provided with options to select one or more actions destinations (second API providers) from among the set of action destinations (a set of API providers).

The action menu 306B may be a drop-down menu which may list multiple actions associated with a selected action destination as user-selectable options. Each action in the action menu 306B may correspond to an API endpoint of the second API provider (selected as an action destination via the action destination menu 306A). In one or more embodiments, instead of providing the action destination menu 306A, all the action destinations in the action destination menu 306A may be combined with the actions in the action menu 306B to offer a single list of actions. In such an implementation, the text description of an action in the action menu 306B may be concatenated with an action destination (or the API provider name). For example, if the action destination is a messaging platform, such as "Slack®", and the action is "send a message", the text description may be provided as "Send a message on Slack".

The action parameter menu 306C may be a drop-down menu that may display multiple action parameters as user-selectable inputs for the selected action(s) via the action menu 306B. Each action parameter in the action parameter menu 306C may correspond to an endpoint parameter for an API endpoint (i.e. a selected action through the action menu 306B) and may be displayed to the user 116 upon the selection of the action.

By way of example, and not limitation, if the action destination is selected as Slack®, the actions menu 306B may be populated with actions such as, but not limited to, Add Reminder, Send Direct Message, Create Channel, Set Channel Topic, Set Status, Send Channel Message, or Send Private Channel Message. The user 116 may select an action as 'Send Direct message' and may choose action parameters as 'tweet text' and 'tweet timestamp'. The API-based action may be composed as "send a message on slack® with the message including the tweet of the specific user and the timestamp of the tweet".

The fourth UI element 308 labelled as, for example, "Setup" and may be a button to submit a user selection of the API-based trigger option, the trigger rule and the API-based action for creation of the API mashup. Upon selection of the fourth UI element 308, the electronic UI 108 may execute a sequence of API calls to the API gateway 214 of the mashup installer 104.

For example, the sequence of API calls may be made to 4 different API endpoints on the mashup installer 104, such as /setupTrigger, /setupRule, /setupAction, and /setupMashup. After the mashup installer 104 receives a first API call from the electronic UI 108, the mashup installer 104 may implement a respective function of the API endpoint called by the first API call. For example, if the first API call is made to /setupTrigger on the mashup installer 104, then the mashup installer 104 may deploy the trigger function 120A on the cloud computing system 102 and may integrate the API gateway 122A with the trigger function 120A. If a webhook-based event detection mechanism is selected (for example, via the electronic UI 300), then the deployed trigger function 120A may be a webhook listener. After the trigger function is successfully deployed, the mashup installer 104 may send a response code to the electronic UI 108. The response code (such as 200) may indicate whether the deployment of the trigger function is successful. Further details of the deployment of trigger function 120A, the rule function 120B, and the action function 120C are provided, for example, in FIG. 4, FIG. 5, FIG. 6, and FIG. 7.

It should be noted that the electronic UI 300 is merely provided as an exemplary example to illustrate a selection of an API-based trigger option, a trigger rule, and an API-based action and should not be construed as limiting for the present disclosure. In some embodiments, the electronic UI 300 may be suitably modified to allow the user 116 to select multiple API-based trigger options and/or multiple API-based actions. For instance, through the electronic UI 300, multiple API-based trigger options may be selected to trigger one single API-based action or one API-based trigger option to trigger multiple API-based actions.

It should be further noted that the trigger rules in the electronic UI 300 are merely provided as an example and should not be construed as limiting for the present disclosure. In some embodiments, the electronic UI 300 may be suitably modified to allow the user 116 to compose more complex trigger rules, such as nested rules (for e.g., if first rule is satisfied, then check if second rule is satisfied, and then trigger an action) or combining multiple trigger rules through a suitable logical operator (for e.g., if both the first rule "AND" the second rule are satisfied, then trigger an action).

Figure 4:
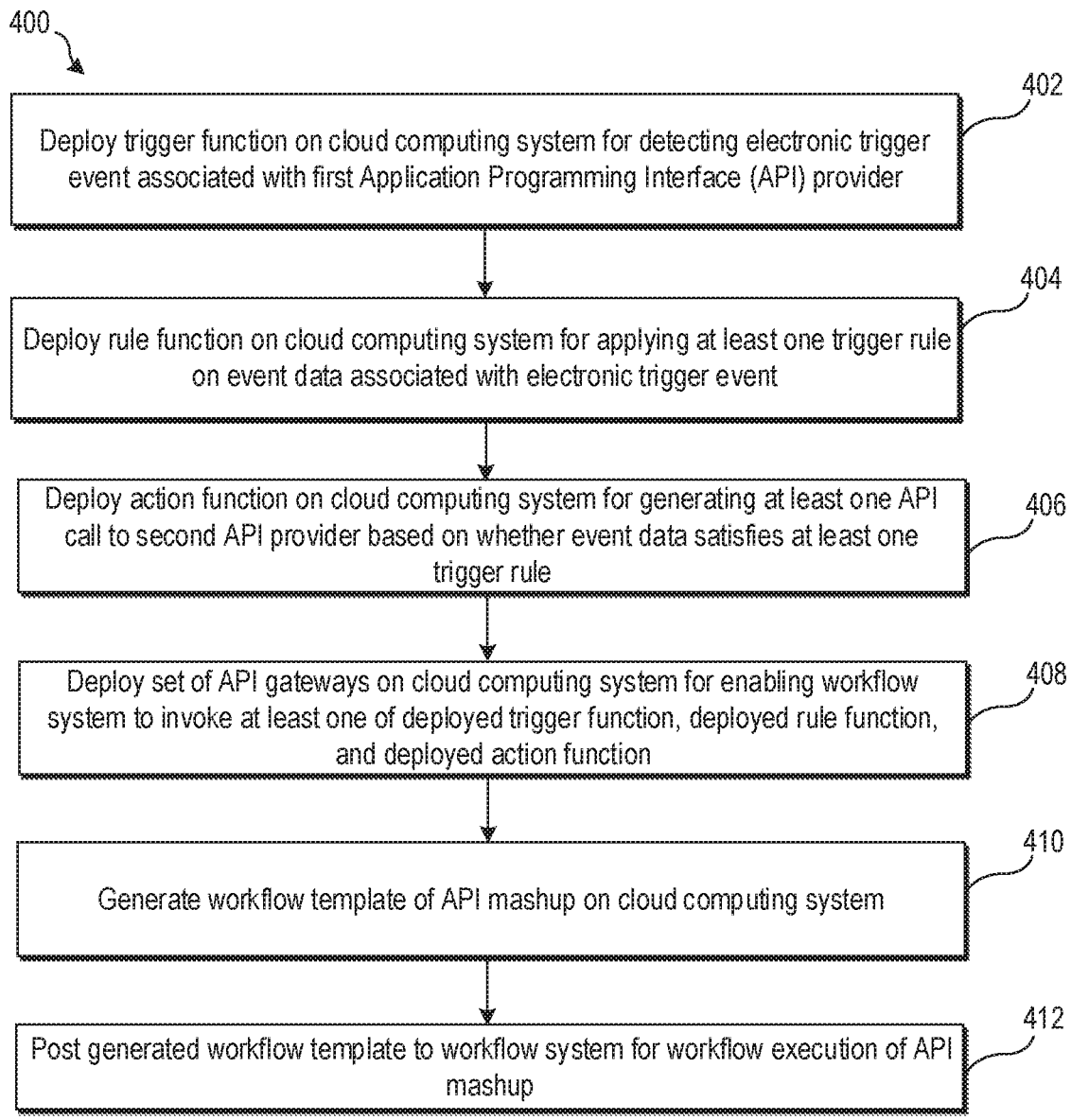
FIG. 4 illustrates a flowchart of an example method for generation of an API mashup infrastructure on a cloud computing system.

FIG. 4 illustrates a flowchart of an example method for generation of an API mashup infrastructure on a cloud computing system, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the mashup installer 104 of FIG. 1 or the first node 202 of FIG. 2.

At 402, the trigger function 120A may be deployed on, for example, a container or a VM of the cloud computing system 102. The trigger function 120A may be deployed for detecting an electronic trigger event associated with a first API provider (or a selected trigger event source). The deployment of the trigger function 120A may be based on a first API call (includes the first input and the set of trigger parameters) from the electronic UI 108.

By way of example, and not limitation, the first API call may be made to /setupTrigger endpoint on the mashup installer 104. An example of the first API call to /setupTrigger endpoint on the mashup installer 104 is provided, as follows:

```
Call Endpoint
POST https://itqnumh001.execute-api.us-east-2.ws.com/setupTrigger
{
    "mashup_id": "10000abc"
    "xtask_id":"1234"
}
```

In this example, the first API call may include a POST request to an example endpoint URL "https://itqnumh001.execute-api.us-east-2.ws.com/setupTrigger". Note that the host address "itqnumh001.execute-api.us-east-2.ws.com" is just an example. It can be any URL address of an instance (e.g. a container or a VM) in a cloud system. The POST request may be received by the API gateway 214 of the mashup installer 104. Along with the POST request, the first API call may include a set of trigger parameters, such as a mashup_id and an xtask_id.

The API gateway 214 may route the POST request and the set of trigger parameters to the mashup installer 104. Herein, when the user 116 composes the trigger, rule, and action components of the API mashup through the electronic UI 108, the electronic UI 108 may assign the mashup_id to the API mashup and the xtask_id to a selected API-based trigger option (i.e. associated with an API endpoint). Based on the xtask_id, the mashup installer 104 may determine an API endpoint which may be selected as the API-based trigger option via the electronic UI 108. Similarly, based on the mashup_id, the mashup installer 104 may be able to identify and track resources, such as trigger, rule, or action functions, deployed on the cloud computing system 102.

In an embodiment, the trigger function 120A may be deployed as a webhook listener. For such an implementation, after the mashup installer 104 receives the first API call via the API gateway 214, the mashup installer 104 may generate a webhook listener which may monitor HTTP POST data sent from the first API provider or a configured webhook service. If the user 116 selects to set up a trigger in the electronic UI 108, then the /setupTrigger endpoint may be called to create a passive listening function (i.e. the trigger function 120A) on the cloud computing system 102. The mashup installer 104 may also generate the first API gateway 122A for the passive listening function and may deploy passive listening function and the first API gateway 122A on the cloud computing system 102.

If the deployment is successful, information associated with passive listening function or the webhook listener and the first API gateway 122A may be saved or stored on the database 118, and the URL of the first API gateway 122A may be returned to the user 116. For example, the URL may be displayed as a webhook URL on the electronic UI 108 of the user device 106. The user 116 may register the URL with the first API provider and may register a webhook service from the API provider. Once an event occurs, the first API provider or the registered webhook service may send an HTTP POST message to the registered URL. In turn, the first API gateway 122A that may be running on the registered URL to accept the HTTP POST message and to send a payload data to the workflow system 112 to activate or invoke the rule function 120B and the action function 120C of the API mashup. In an embodiment, if the API mashup is an IFTTT mashup, then when the trigger event is detected and notified by the passive trigger listener, the function of the trigger function 120A may remain only to read the HTTP POST payload data and send the data to rule function 120B and the action function 120C for processing. Note that a unique "mashup id" may be assigned when the trigger function 120A is generated, and the rule function 120B and the action function 120C for the same API mashup may be assigned with the same "mashup id". Further details about the deployment of the trigger function 120A are be provided, for example, in FIG. 5.

At 404, the rule function 120B may be deployed on, for example, a container or a VM of the cloud computing system 102. The rule function 120B may be deployed for applying at least one trigger rule on the event data associated with the electronic trigger event. Herein, the event data may be included in, for example, the HTTP POST payload from the first API provider, or a webhook message from the webhook service associated with the first API provider. The deployment of the rule function 120B may be based on a second API call (includes the second input and the set of rule parameters) from the electronic UI 108.

By way of example, and not limitation, the second API call may be made to /setupRule endpoint on the mashup installer 104. An example of the second API call to /setupRule endpoint on the mashup installer 104 is provided, as follows:

```
Call Endpoint
POST https://itqnumh001.execute-api.us-east-2.ws.com/setupRule
{
    "mashup_id": "10000abc"
    "xtask_id":"r0001"
    "Trigger_Output": "{{trigger.key}}"
    "Operator": "equals"
    "Pattern": "100"
}
```

In this example, the second API call may include a POST request to an example endpoint URL "https://itqnumh001.execute-api.us-east-2.ws.com/setupRule". Note that the host address "itqnumh001.execute-api.us-east-2.ws.com/setupRule" is just an example. It can be any URL address of an instance (e.g. a container or a VM) in a cloud system. The POST request may be received by the API gateway 214 of the mashup installer 104. Along with the POST request, the second API call may include the set of rule parameters, such as the mashup_id, the xtask_id, Trigger_Output parameter, an operator, and a pattern. The API gateway 214 may route the POST request and the set of rule parameters to the mashup installer 104. Further details about the deployment of the rule function 120B are provided, for example, in FIG. 6.

At 406, the action function 120C may be deployed on, for example, a container or a VM of the cloud computing system 102. The action function 120C may be deployed for generating at least one API call to a second API provider (related to the selected API-based action) based on whether the event data (such as trigger_output) satisfies at least one trigger rule (specified by an operator and a pattern in the deployed rule function). The deployment of the action function 120C may be based on a third API call (includes the third input and the set of action parameters) from the electronic UI 108.

By way of example, and not limitation, the third API call may be made to /setupAction endpoint on the mashup installer 104. An example of the third API call to /setupAction endpoint on the mashup installer 104 is provided, as follows:

```
Call Endpoint
POST https://itqnumh001.execute-api.us-east-2.ws.com/setupAction
{
```

-continued

```
   "mashup_id": "10000abc"
   "X-task id": "1166"
   "Channel": "#FLA"
   "message": "Welcome!"
}
```

In this example, the third API call may include a POST request to an example endpoint URL "https://itqnumh001.execute-api.us-east-2.ws.com/setupAction".

Note that the host address "itqnumh001.execute-api.us-east-2.ws.com/setupAction" is just an example. It can be any URL address of an instance (e.g. a container or a VM) in a cloud system. The POST request may be received by the API gateway 214 of the mashup installer 104. Along with the POST request, the third API call may include the set of action parameters, such as the mashup_id, the xtask_id of an API endpoint selected as an API-based action, and endpoint parameters for the API endpoint. For example, if the API endpoint is associated with posting of a message to a particular channel on a messaging platform, then the endpoint parameters may include, a channel name (e.g., "#FLA") and a message ("Welcome!"). The API gateway 214 may route the POST request and the set of action parameters to the mashup installer 104. Further details about the deployment of the action function 120C are be provided, for example, in FIG. 7.

At 408, the set of API gateways 122A, 122B, 122C may be deployed on, for example, a container or a VM of the cloud computing system 102. The set of API gateways 122A, 122B, 122C may include the first API gateway 122A, the second API gateway 122B, and the third API gateway 122C. The first API gateway 122A may be associated with the deployed trigger function 120A. The second API gateway 122B may be associated with the deployed rule function 120B and the third API gateway 122C may be associated with the deployed action function 120C. Each of the first API gateway 122A, the second API gateway 122B, and the third API gateway 122C may provide an interface to invoke the deployed trigger function 120A, the deployed rule function 120B, and the deployed action function 120C, respectively. The set of API gateways 122A, 122B, 122C may be deployed for enabling the workflow system 112 to invoke at least one of the deployed trigger function 120A, the deployed rule function 120B, and the deployed action function 120C for a workflow execution of the API mashup.

At 410, a workflow template of the API mashup may be generated. The workflow template may be generated based on the information associated with the deployed set of API gateways 122A, 122B, 122C and each of the deployed trigger function 120A, the deployed rule function 120B, and the deployed action function 120C. The workflow template may include a first description including a workflow sequence for invoking the deployed trigger function 120A, the deployed rule function 120B, and the deployed action function 120C. The workflow template may further include a second description. The second description may include the set of trigger parameters, the set of rule parameters, and the set of action parameters that may be received via the electronic UI 108. The workflow template may further include a service tag. The service tag may include a provider and a connector for the workflow system 112. The provider and the connector may be mapped to URLs of the deployed set of API gateways 122A, 122B, 122C. Details about generation of the workflow template are provided, for example, in FIG. 8.

At 412, the generated workflow template may be posted to the workflow system 112. The generated workflow template may be posted to the workflow system 112 for a workflow execution of the API mashup on the workflow system 112. The mashup installer 104 may be configured to transmit the generated workflow template to the workflow system 112, via the communication network 114. Details about the workflow execution of the API mashup are provided in FIG. 10.

Control may pass to end. Although the flowchart 400 is illustrated as discrete operations, such as 402, 404, 406, 408, 410, and 412. However, in certain embodiments, such discrete operations may be further divided into additional operations, combined into fewer operations, or eliminated, depending on the particular implementation without detracting from the essence of the disclosed embodiments.

Figure 5:
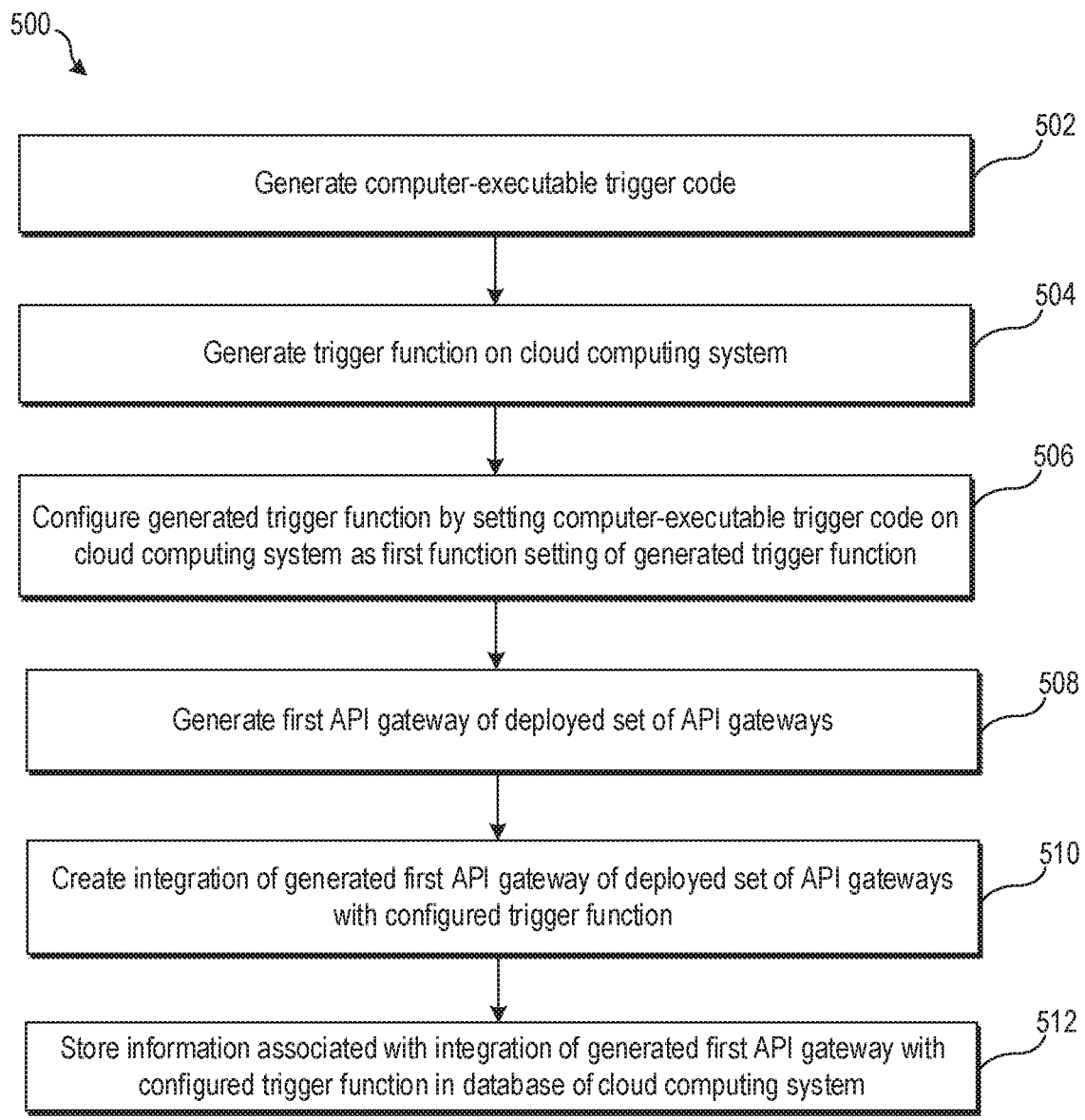
FIG. 5 illustrates a flowchart of an example method of deployment of a trigger function on a cloud computing system.

FIG. 5 illustrates a flowchart of an example method of deployment of a trigger function on a cloud computing system, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the mashup installer 104 of FIG. 1 or the first node 202 of FIG. 2.

Operations from 502 to 512 may be performed after the mashup installer 104 receives the first API call (i.e. the first input) from electronic UI 108, via the API gateway 214. Such operations may be considered as part of the deployment of the trigger function 120A on the cloud computing system 102.

At 502, a computer-executable trigger code may be generated. In an embodiment, the mashup installer 104 may generate the computer-executable trigger code for listening to or detecting an electronic trigger event on the first API provider. The computer-executable trigger code may be generated based on the received first API call (which includes the first input and the set of trigger parameters). The computer-executable trigger code may be, for example, an API call code to periodically call an API endpoint associated with the API-based trigger option (selected via the electronic UI 108). The API-based option may be identified by a unique identifier, such as the xtask_id described in 402 of FIG. 4).

At 504, the trigger function 120A may be generated on the cloud computing system 102. Based on the reception of the first API call, the mashup installer 104 may generate the trigger function 120A. In an embodiment, the trigger function 120A may provide a serverless compute service to execute the computer-executable trigger code in the cloud environment. The serverless compute service may automatically manage the underlying computing resources based on which the computer-executable trigger code may be executed.

At 506, the generated trigger function 120A may be configured for execution on the cloud computing system 102. The generated trigger function 120A may be configured by setting the generated computer-executable trigger code on the cloud computing system 102 as a first function setting of the generated trigger function 120A. Before the setting, the generated computer-executable trigger code may be uploaded on the cloud computing system 102. The generated trigger function 120A may be further configured by updating a second function setting of the generated trigger function 120A. The second function setting may be updated by creation of code libraries (such as a requests library to process API calls, or a urllib library for URL handling), identity and access management (IAM) roles, and permissions for the generated trigger function 120A.

At 508, the first API gateway 122A of the set of API gateways 122A, 122B, and 122C may be generated on the cloud computing system 102. The first API gateway 122A may be required to invoke the generated trigger function 120A. To generate the first API gateway 122A, the mashup installer 104 may create a first representational State Transfer (REST) API in an API gateway service provided by the cloud computing system 102. The mashup installer 104 may determine an API identifier and a root resource identifier based on the created first REST API in the API gateway 214. The API identifier may correspond to a unique identifier of the first API gateway 122A and the root resource identifier may correspond to a base path URL of the first API gateway 122A. The mashup installer 104 may create a resource and an HTTP POST method for the first API gateway 122A. After the creation of the resource and the HTTP POST method for the first API gateway 122A, the mashup installer 104 may create identity and access management (IAM) roles and permissions for the first API gateway 122A.

At 510, an integration of the first API gateway 122A of the deployed set of API gateways 122A, 122B, and 122C with the configured trigger function 120A may be created. After the integration is created, the trigger function 120A may be considered as deployed and ready to be invoked via a call to the first API gateway 122A.

At 512, information associated with the first API gateway 122A, the trigger function 120A, and the integration of the first API gateway 122A with the trigger function 120A may be stored in the database 118. Such information may include, for example, the URL of the first API gateway 122A, an identifier of the VM or the container where the trigger function 120A may be deployed, and the like.

In an embodiment, the generated trigger function 120A may be a webhook listener. In such a case, the mashup installer 104 may return the URL of the first API gateway 122A as a webhook URL to the user device 106. In some cases, the URL may be returned after the information at 512 is stored on the database 118. The user device 106 may receive the webhook URL and may display the webhook URL on the electronic UI 108. The user 116 may use the webhook URL to register with a webhook service, which when configured, may detect an electronic trigger event from the first API provider and may send a webhook message (including the event data associated with the detected electronic trigger event) to the trigger function 120A, via the first API gateway 122A.

For example, the webhook listener may be generated as the trigger function 120A based on a user selection of the webhook-based trigger detection mechanism via the trigger detection mechanism menu 302D. The Uniform Resource Locator (URL) of the first API gateway 122A may be a webhook URL on which the webhook message including the event data may be received from the webhook service associated with the first API provider. Details of the webhook listener are provided, for example, at 402 of FIG. 4.

In another embodiment, the generated trigger function may be a polling-based trigger function, which may be configured to implement a polling method using the generated computer-executable trigger code. For example, the polling method may be implemented based on a user selection of the polling-based trigger detection mechanism via the trigger detection mechanism menu 302D. The generated trigger function 120A, when triggered or invoked, may execute the computer-executable trigger code to periodically call an API endpoint of the first API provider and may receive a sequence of responses from the API endpoint. The electronic trigger event may be detected based on a comparison between a first response in the received sequence of responses and a second response in the received sequence of responses.

Control may pass to end. Although the flowchart 500 is illustrated as discrete operations, such as 502, 504, 506, 508, 510, and 512. However, in certain embodiments, such discrete operations may be further divided into additional operations, combined into fewer operations, or eliminated, depending on the particular implementation without detracting from the essence of the disclosed embodiments.

Figure 6:
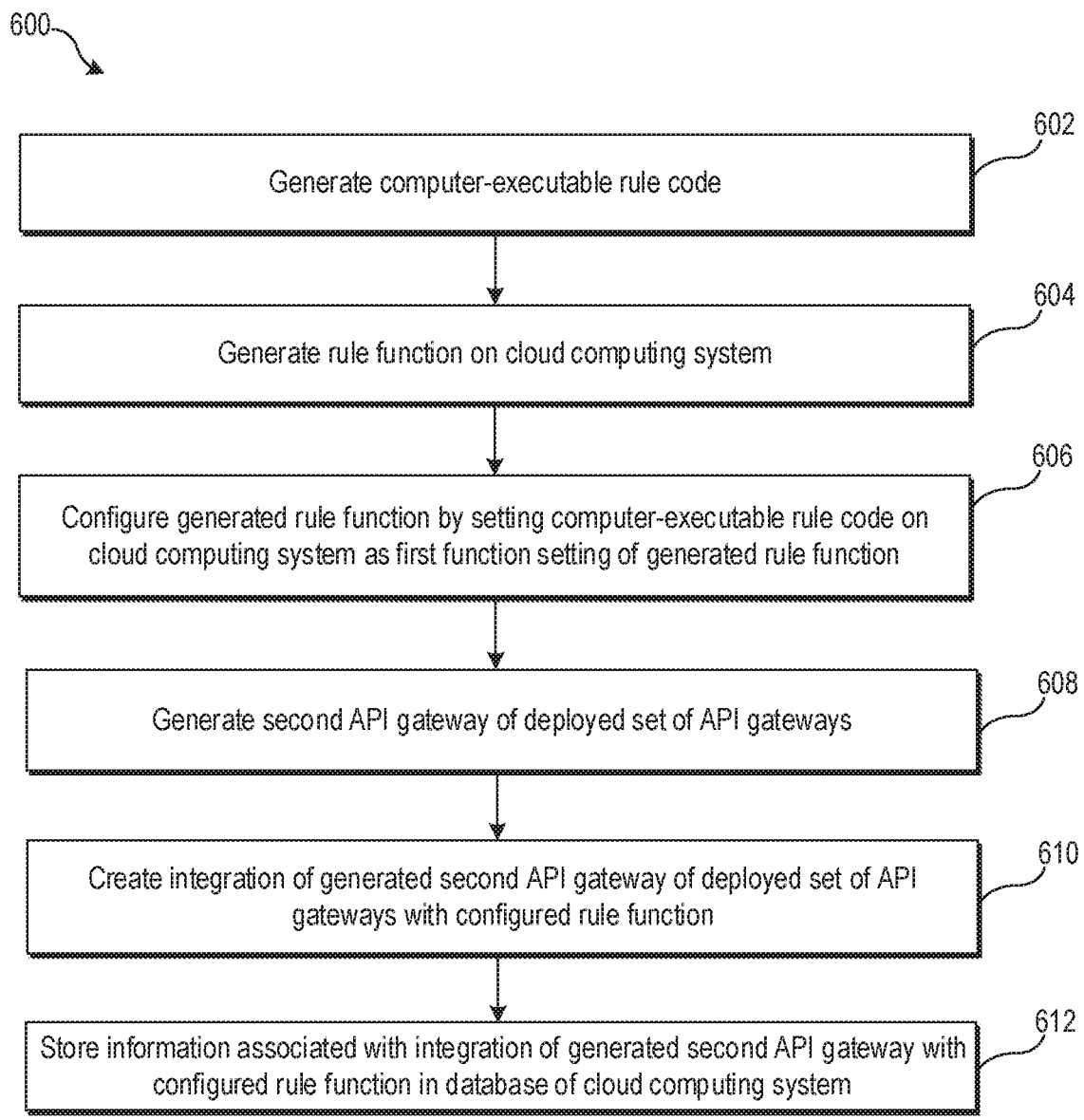
FIG. 6 illustrates a flowchart of an example method of deployment of a rule function on a cloud computing system.

FIG. 6 illustrates a flowchart of an example method of deployment of a rule function on a cloud computing system, according to at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the mashup installer 104 of FIG. 1 or the first node 202 of FIG. 2.

Operations from 602 to 612 may be performed after the mashup installer 104 receives the second API call from electronic UI 108, via the API gateway 214. Such operations may be considered as part of the deployment of the rule function 120B on the cloud computing system 102.

At 602, a computer-executable rule code may be generated. In an embodiment, the mashup installer 104 may generate the computer-executable rule code. The computer-executable rule code may be generated based on the received second API call (which includes the second input and the set of rule parameters). When executed, the generated computer-executable rule code may apply at least one trigger rule on the event data associated with the electronic trigger event.

In an embodiment, the computer-executable rule code may include a trigger output value (i.e. the event data associated with a detection of the electronic trigger event) and criteria for comparison as inputs to an operator function. The output of the operator function may be a binary indication (such as True or False) to show whether an "if" condition is met or not. For example, in case the operator is the "equal" operator, a simplified version of the computer-executable rule code may be given, as follows:

```
def equals (trigger_output_value, criteria):
    #check if both trigger_output_value and
    criteria are legal
    return trigger_output_value == criteria
```

At 604, the rule function 120B may be generated on the cloud computing system 102. After the reception of the second API call, the mashup installer 104 may generate the rule function 120B.

At 606, the generated rule function 120B may be configured for execution on the cloud computing system 102. The generated rule function 120B may be configured by setting the generated computer-executable rule code on the cloud computing system 102 as a first function setting of the generated rule function 120B. The generated rule function 120B may be further configured by updating a second function setting of the generated rule function 120B. The second function setting may be updated by creation of code libraries (such as the requests library and the urllib library), identity and access management (IAM) roles and permissions for the generated rule function 120B.

At 608, the second API gateway 122B of the set of API gateways may be generated on the cloud computing system 102. The second API gateway 122B may be required to invoke the generated rule function 120B. To generate the second API gateway 122B, the mashup installer 104 may create a second REST API in the API gateway 214 service provided by the cloud computing system 102. The mashup installer 104 may determine an API identifier and a root resource identifier based on the created second REST API. The API identifier may correspond to a unique identifier of the second API gateway 122B and the root resource identifier may correspond to the base path URL of the second API gateway 122B. The mashup installer 104 may create a resource and an HTTP POST method for the second API gateway 122B. After the creation of the resource and the HTTP POST method for the second API gateway 122B, the mashup installer 104 may create identity and access management (IAM) roles and permissions for the second API gateway 122B.

At 610, an integration of the second API gateway 122B of the deployed set of API gateways 122A, 122B, and 122C with the configured rule function 120B may be created. After the integration is created, the rule function 120B may be considered as deployed and ready to be invoked via a call to the second API gateway 122B. By way of example, and not limitation, the rule function 120B may be deployed on the cloud computing system 102, with an invoking interface provided by the second API gateway 122B.

At 612, information associated with the rule function 120B, the second API gateway 122B, and the integration of the second API gateway 122B with the rule function 120B may be stored in the database 118. The information may include, for example, the URL of the second API gateway 122B, an identifier of the VM or the container where the rule function 120B may be deployed, and the like.

By way of example, and not limitation, after "/setupRule" endpoint may be invoked, the mashup installer 104 may upload the generated computer-executable rule code (such as the simplified code of the foregoing example) to a container or a VM on the cloud computing system 102. Also, the mashup installer 104 may create libraries and IAM roles required to execute the uploaded code, correctly. The second API gateway 122B may be generated on the cloud computing system 102. Similarly, the corresponding resources and IAM roles may be configured so that by using an HTTP POST method, the rule function 120B can be invoked.

After the rule function 120B and the second API gateway 122B are deployed, an invoke URL of the second API gateway 122B may be automatically converted to a provider and a connector for future usage of the API mashup. The workflow system 112 may invoke the second API gateway 122B and the rule function 120B, by calling the generated provider and connector. Note that the trigger output value may be unknown when the rule function 120B is initially deployed. The value may be only available when an event is triggered. In an embodiment, when the rule function 120B is deployed, a special schema "{{trigger.key}}" may be defined in a payload of the second API call to the mashup installer 104. An example of such payload in a JavaScript Object Notation (JSON) format for /setupRule, is provided, as follows:

```
{
 "mashup_id":"00000009",
 "xtask_id":"r00002",
 "trigger_output":"{{trigger.sender}}",
 "operator":"equals",
 "pattern":abc@xyz.com
}
```

After a webhook message is received, the rule function 120B may convert the "{{trigger.key}}" into actual values based on the webhook message. In this example, if the trigger output value for a given key "sender" equals to "abc@xyz.com", the trigger rule may be satisfied.

Control may pass to end. Although the flowchart 600 is illustrated as discrete operations, such as 602, 604, 606, 608, 610, and 612. However, in certain embodiments, such discrete operations may be further divided into additional operations, combined into fewer operations, or eliminated, depending on the particular implementation without detracting from the essence of the disclosed embodiments.

Figure 7:
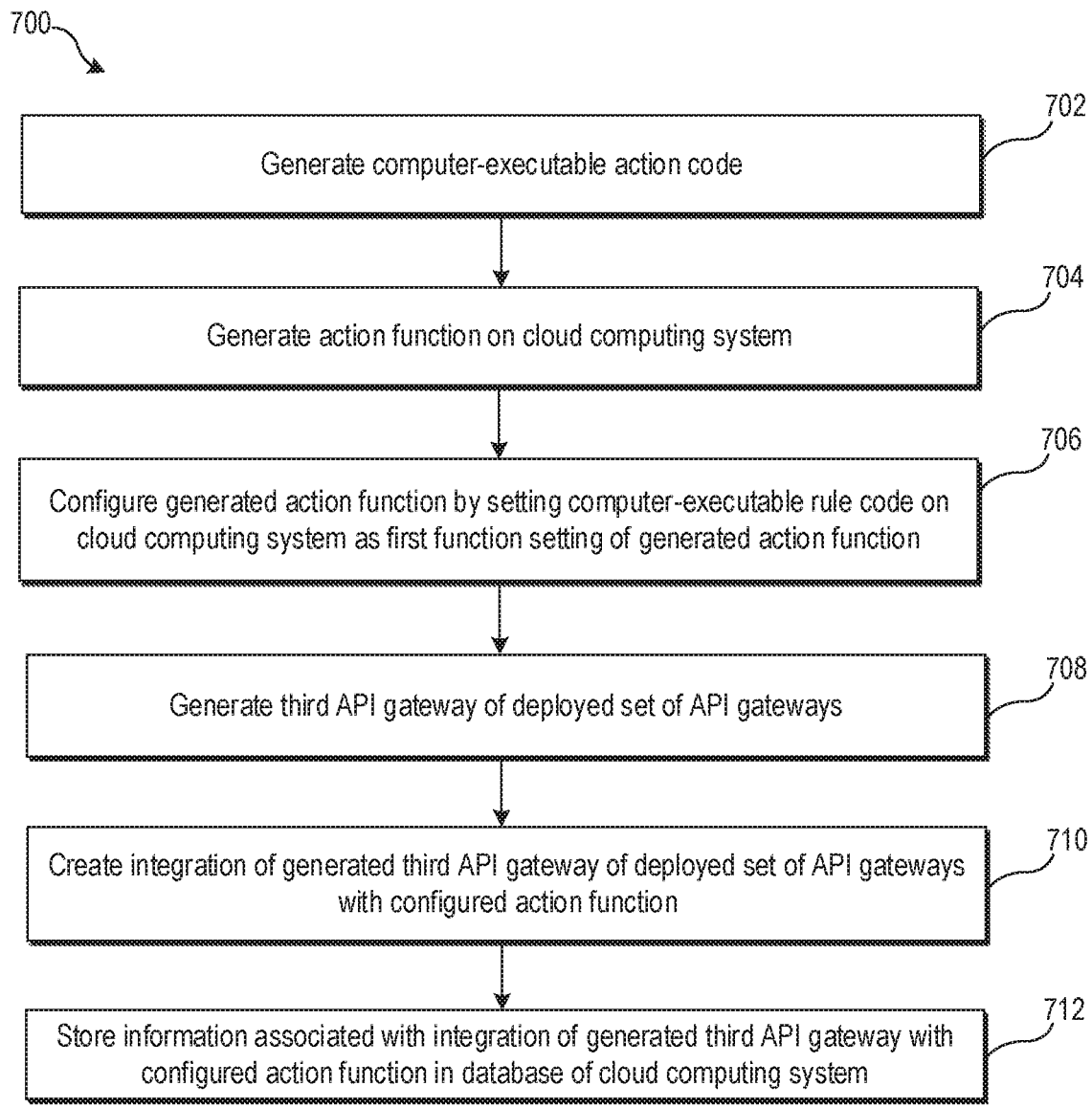
FIG. 7 illustrates a flowchart of an example method for deployment of an action function on a cloud computing system.

FIG. 7 illustrates a flowchart of an example method for deployment of an action function on a cloud computing system, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the mashup installer 104 of FIG. 1 or the first node 202 of FIG. 2.

Operations from 702 to 712 may be performed after the mashup installer 104 receives the third API call (includes the third input and the set of action parameters) from electronic UI 108, via the third API gateway 122C. Such operations may be considered as part of the deployment of the action function 120C on the cloud computing system 102.

At 702, a computer-executable action code may be generated. In an embodiment, the mashup installer 104 may generate the computer-executable action code. The computer-executable action code may be generated based on the received third API call (which includes the third input and the set of action parameters). When executed, the generated computer-executable action code may generate at least one API call to the second API provider (specified in the API-based action selected via the electronic UI 108) based on whether the event data satisfies at least one trigger rule.

By way of example, and not limitation, the computer-executable action code may be an API call code to an API endpoint associated with the second API provider. The API call code may be generated based on an API specification file, such as an OpenAPI Specification (OAS) file. Such a file may define a standard, programming language-agnostic interface description for Representational State Transfer (REST) APIs. Many API providers offer OAS for their APIs. If the OAS is not offered, machine learning methods may be applied to learn unstructured API documentations, retrieve essential information from such documentations, and convert such information to a structured OAS file. Based on the OAS file, the API call code may be generated. An example of the computer-executable action code in Python programming language is provided, as follows:

```
import requests
headers = {'Content-Type': 'application/json',
 'Authorization': api_token}
```

```
URL= host-address + endpoint
payload = {'key1': 'value1', 'key2': 'value2'}
# call API using "GET", "POST", etc.
response = requests.get (URL, headers=headers,
   params=payload)
```

At 704, the action function 120C may be generated on the cloud computing system 102. After the reception of the third API call, the mashup installer 104 may generate the action function 120C.

At 706, the generated action function 120C may be configured for execution on the cloud computing system 102. The generated action function 120C may be configured by setting the generated computer-executable action code on the cloud computing system 102 as a first function setting of the generated action function 120C. The generated action function 120C may be further configured by updating a second function setting of the generated action function 120C. The second function setting may be updated by creation of code libraries (such as requests library and urllib library), identity and access management (IAM) roles and permissions associated with generated action function 120C.

At 708, the third API gateway 122C of the set of API gateways 122A, 122B, and 122C may be generated on the cloud computing system 102. The third API gateway 122C may be required to invoke the generated action function 120C. To generate the third API gateway 122C, the mashup installer 104 may create a representational State Transfer (REST) API in an API gateway service provided by the cloud computing system 102. The mashup installer 104 may determine an API identifier and a root resource identifier based on the created REST API. The API identifier may correspond to a unique identifier of the third API gateway 122C and the root resource identifier may correspond to a base path URL of the third API gateway 122C. The mashup installer 104 may create a resource and an HTTP POST method for the third API gateway 122C. After the creation of the resource and the HTTP POST method for the third API gateway 122C, the mashup installer 104 may create identity and access management (IAM) roles and permissions for the third API gateway 122C.

At 710, an integration of the third API gateway 122C of the deployed set of API gateways 122A, 122B, and 122C with the configured action function 120C may be created. After the integration, the action function 120C may be considered as deployed and ready to be invoked via a call to the third API gateway 122C.

At 712, information associated with the third API gateway 122C, the action function 120C, and the integration of the third API gateway 122C with the action function 120C may be stored in the database 118. The information may include, for example, a URL of the third API gateway 122C, an identifier of the VM or the container where the action function 120C may be deployed, and the like.

Control may pass to end. Although the flowchart 700 is illustrated as discrete operations, such as 702, 704, 706, 708, 710, and 712. However, in certain embodiments, such discrete operations may be further divided into additional operations, combined into fewer operations, or eliminated, depending on the particular implementation without detracting from the essence of the disclosed embodiments.

Figure 8:
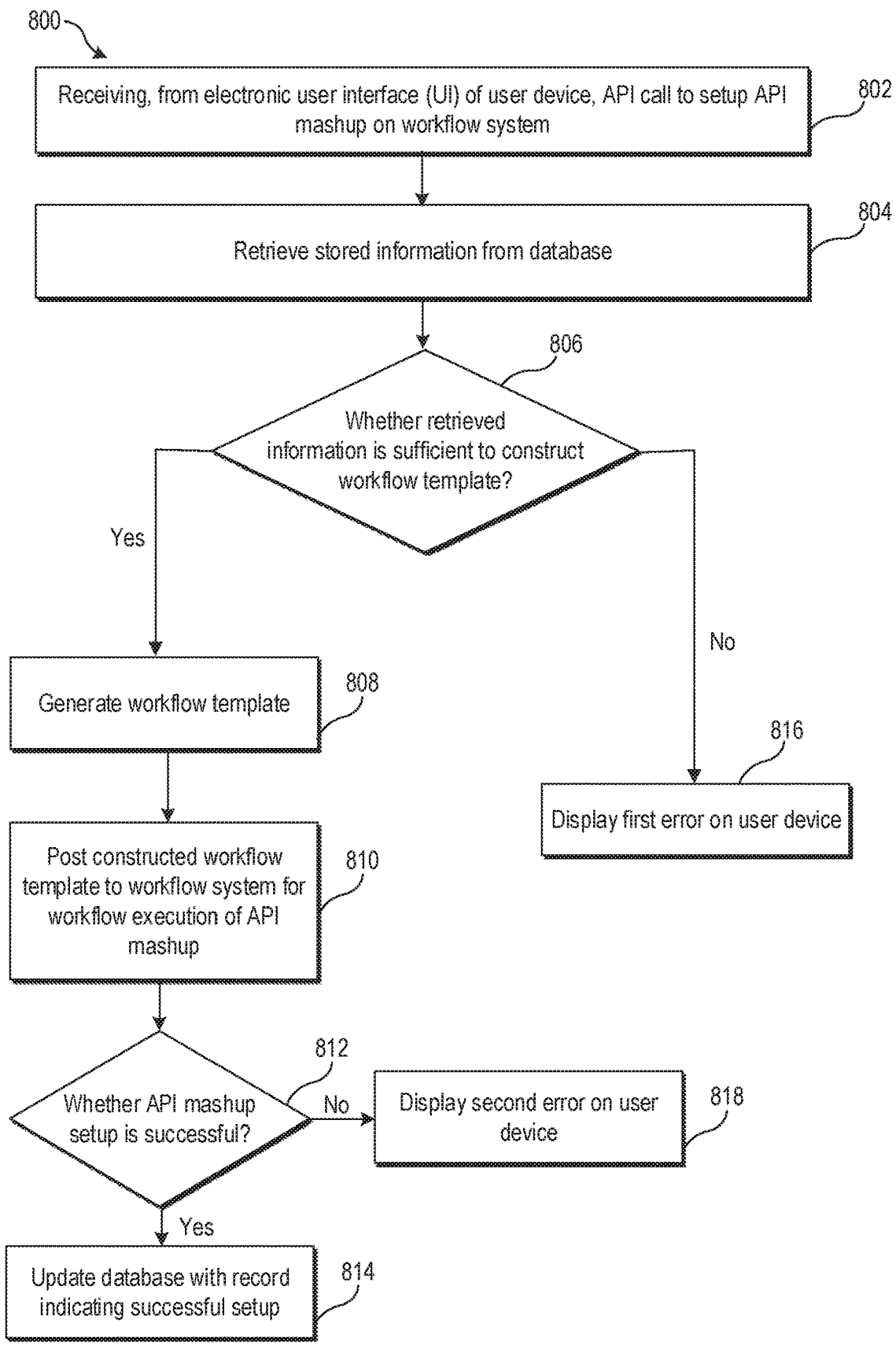
FIG. 8 illustrates a flowchart of an example method for generation of a workflow template.

FIG. 8 illustrates a flowchart of an example method for generation of a workflow template, according to at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the mashup installer 104 of FIG. 1 or the first node 202 of FIG. 2.

At 802, an API call may be received by the mashup installer 104. The API call may be received to setup the API mashup on the workflow system 112. The setup of the API mashup may include a generation of the workflow template. An example of the API call to a /setupMashup endpoint on the mashup installer 104 is provided, as follows:

```
Call Endpoint
POST https://itqnumh001.execute-api.us-east-2.ws.com/execution
{
   "mashup_id": "10000abc"
}
```

After the trigger function 120A, the rule function 120B, and the action function 120C are successfully set up, /setupMashup endpoint may be called to automatically connect them together in the workflow system 112 to build the API mashup. Operations from 804 to 818 may be performed after the mashup installer 104 receives the API call from electronic UI 108. Such operations may be considered as part of building of the API mashup on the workflow system 112.

At 804, information stored in the database 118 may be retrieved. In an embodiment, the mashup installer 104 may retrieve the information stored in the database 118. The information stored in the database 118 may include the information (e.g., stored at 512) related to the trigger function 120A and the first API gateway 122A, the information (e.g., stored at 612) related to the rule function 120B and the second API gateway 122B, the information (e.g., stored at 712) related to the action function 120C and the third API gateway 122C.

In an embodiment, the mashup installer 104 may retrieve the information from three separate databases in the database 118. These three databases, may be, for example, a mashup database which manages information (such as a mashup id, a trigger, a rule, and an action) associated with the API mashup, a workflow database which manages information (such as a historyID or a P_rand)) needed to save for "hacking" the workflow system 112, and an Xtask to Workflow mapping database which converts an x-task id to a corresponding component-ids (such as a combination of a connector ID and a provider ID to run a function).

At 806, it may be determined whether the retrieved information is sufficient to generate the workflow template. The sufficient information to generate the workflow template may include the retrieved information associated with the deployed set of API gateways 122A, 122B, and 122C and each of the deployed trigger function 120A, the deployed rule function 120B, and the deployed action function 120C. If the information present in the database 118 is sufficient to generate the workflow template, control may pass to 808. Otherwise, control may pas to 816.

At 808, the workflow template may be generated. The workflow template may be generated based on a determination that the retrieved information, stored in the database 118, is sufficient to generate the workflow template The workflow template may describe the API mashup by connecting the trigger function 120A, the rule function 120B, and the action function 120C. Also, the workflow template may include a first description, a second description, and a service tag. The first description may include a workflow sequence for invoking the deployed trigger function 120A, the deployed rule function 120B, and the deployed action function 120C. The first description may specify the entire workflow of the API mashup. The second description may include a set of trigger parameters (received at 402), a set of rule parameters (received at 404), and a set of action parameters (received at 406). The service tag may include a provider and a connector for the workflow system 112. The provider and the connector may be mapped to URLs of the deployed set of API gateways 122A, 122B, and 122C. The first description, the second description, and the service tag may be present in a structured format, such as, but not limited to, JSON or XML. By way of example and not limitation the workflow template with a base64 parameter encoding is provided, as follows:

```
        <p:desc/>
    </p:sequence>
    </p:step>
</p:step uid = "AE7FA11D-CB09-BC0F-2464-A6889FC46B70" id = 1
name="Trigger" type = "Activity">
<p:desc/>
        <p:action type = "webservice">
            <p:result inject = "false"/>
            <P:delegation block = "false"/>
            <P:service href =
            "config/113921513248194956/horst/886861/service/1303815?P_ve
            rsion = $ {P_version} & amp; P_mode =$ {P_mode}>
        </p:action>
        <p/map type = "output" hidden = "false" transformation = "trim">
            <P:from encoding = "base64">JHtjQX3Jlc3VsdH0</P:from>
            <P:to encoding = "base64">UF9yZXN1bHQ </P:to>
        </P:map>
        <P:sequence uid = "A168AED7- 29F5-S6F7-D96F-A688AE3A5574" next = "2"
name = "">
    <p:desc />
    </p:sequence>
    </p:step>
<P:step uid = "8893DDFE-7AA8-9B48-1A3A-405c500DODO" id ="2" name = "Rule"
type = "activity">
        <p:desc/>
        <p:action type = "webservice">
            <p:result inject = "false"/>
            <P:delegation block = "false"/>
            <P:service href =
            "config/11392126626541545121/horst/89111/service/1303861?P_
            version = $ {P_version} & amp; P_mode =$ {P_mode}>
        </p:action>
        <p/map type = "input" hidden = "false" transformation = "trim">
            <P:from encoding = "base 64">JHtjjhcnwegbg94 </P:from>
            <P:to encoding = "base 64">aWjs6jhh450h </P:to>
        </P:map>
        <p/map type = "input" hidden = "false" transformation = "trim">
            <P:from encoding = "base 64">Qg4dfuhjohrw346g4 </P:from>
            <P:to encoding = "base 64">a1654gtqplvec </P:to>
        <P:map>
        <p/map type = "input" hidden = "false" transformation = "trim">
            <P:from encoding = "base 64"> 674hJhreqjlhjqnfr</P:from>
            <P:to encoding = "base 64">a1654gtqplvec </P:to>
        <P:map>
        <P:sequence uid = "C994783- 0551C-2351-402C4210TACY" next = "3" name
="">
            <P:desc/>
        </P:sequence>
<P:step>
<P:step uid = "F5121JEHF- JG124E-2265-GFJ754310" id= "3" name = "Action" type =
"Activity">
        <P:desc>
        <P:action type = "webservice">
            <P:result inject -= "false">
            <P:delegation block = "false"/>
            <P:service href =
config/113565921231231583/host/887311/service/1305421? P_version = $
{P_version} & amp; P_mode =$ {P_mode}
        </P:action>
```

At 810, the generated workflow template may be posted to the workflow system 112 for a workflow execution of the API mashup. Details about the workflow execution of the API mashup are provided in FIG. 10.

At 812, it may be determined whether a setup of the API mashup is successful. In an embodiment, the mashup installer 104 may determine whether the setup of the API mashup is successful. In case the setup is successful, control may pass to 814. Otherwise, control may pass to 818.

At 814, the database 118 may be updated with a record indicating a successful setup of the API mashup on the workflow system 112. Also, a status message may be posted on the electronic UI 108 of the user device 106 to indicate the successful setup of the API mashup.

At 816, a first error may be displayed on the electronic UI 108 of the user device 106. The first error may correspond to an absence of sufficient information in the database 118 to generate the workflow template.

At 818, a second error may be displayed on the electronic UI 108 of the user device 106. The second error may correspond to an unsuccessful attempt in the setup of the API mashup on the workflow system 112. Such an error may occur if, for example, the workflow template is rejected by the workflow system 112.

Control may pass to end. Although the flowchart 800 is illustrated as discrete operations, such as 802, 804, 806, 808, 810, 812, 814, 816, and 818. However, in certain embodiments, such discrete operations may be further divided into additional operations, combined into fewer operations, or eliminated, depending on the particular implementation without detracting from the essence of the disclosed embodiments.

Figure 9:
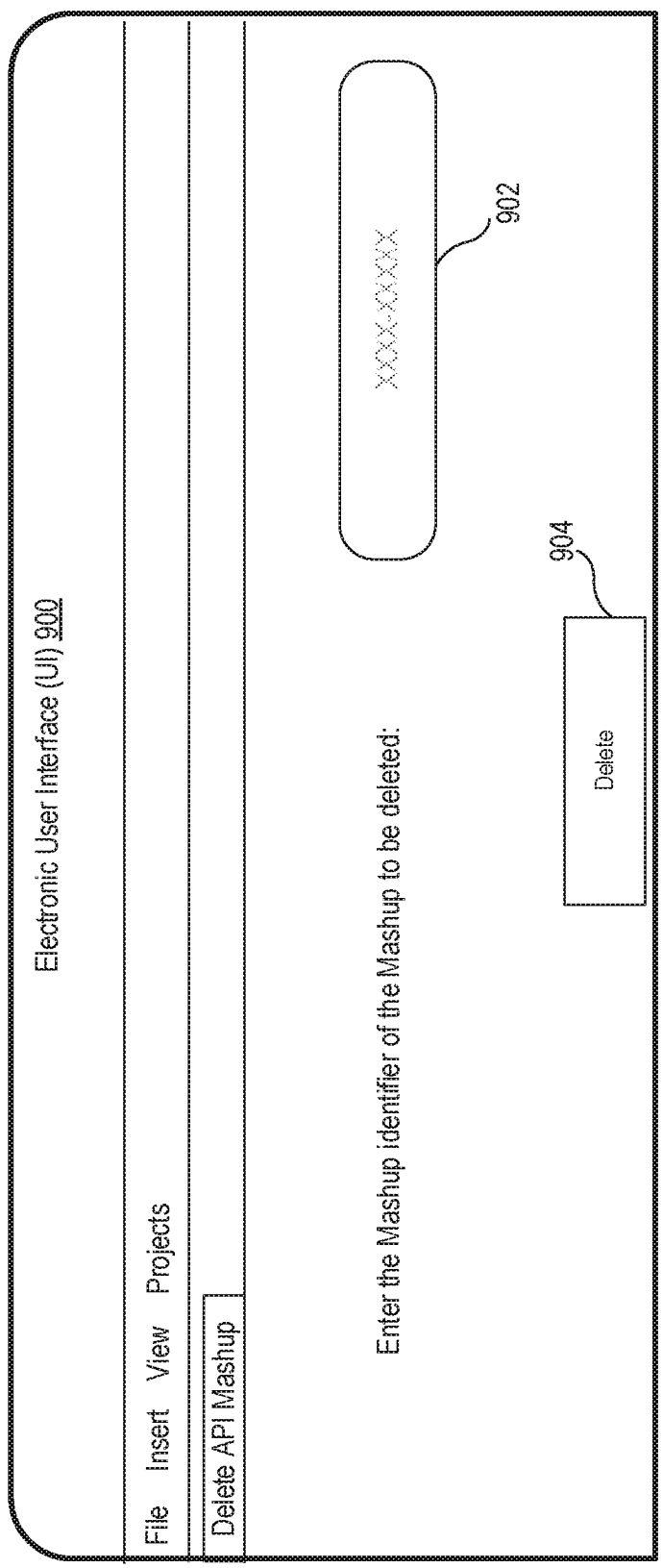
FIG. 9 is a diagram that illustrates an example electronic user interface for a deletion of an API mashup and an associated mashup infrastructure.

FIG. 9 is a diagram that illustrates an example electronic user interface for a deletion of an API mashup and an associated mashup infrastructure, according to at least one embodiment described in the present disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an electronic UI 900, which may be an exemplary implementation of the electronic UI 108 of FIG. 1.

The electronic UI 900 may be displayed on the user device 106 based on a user request, which may be received via an application interface displayed onto a display screen of the user device 106. The application interface may be part of an application software, for example, a software development kit (SDK), a cloud server-based application, a web-based application, an OS-based application/application suite, an enterprise application, a mobile application.

On the electronic UI 900, there is shown a set of UI elements, such as a UI element 902 and an UI element 904. The UI element 902 may be labelled as "Enter the Mashup identifier of the Mashup to be deleted" and may be a textbox. The mashup installer 104 may receive a fourth input from the electronic UI 108 of the user device 106. The fourth input may include an option to delete the API mashup associated with a mashup ID (e.g., entered via the UI element 902).

In an embodiment, the fourth input may include an API call to an endpoint on the mashup installer 104 to delete the API mashup. An example of the API call to /deleteMashup endpoint on the mashup installer 104 is provided, as follows:

```
Call Endpoint
POST https://itqnumh001.execute-api.us-east-2.ws.com/deletion
{
    "mashup_id": "10000abc"
}
```

Based on the fourth input, the mashup installer 104 may release resources associated with the API mashup, whose mashup ID may be provided in the fourth input. The resources may be released from the cloud computing system 102 and the workflow system 112. In an embodiment, the releasing of the resources may include deletion of the deployed trigger function 120A, the deployed rule function 120B, and the deployed action function 120C from the cloud computing system 102. The releasing of the resources may further include deletion of the workflow template associated with the mashup ID. The releasing of the resources may also include deletion of the information associated with the mashup ID from the database 118.

In an embodiment, the deletion of the API mashup may be triggered based on selection of the UI element 904 (which may be labelled as, for example, "Delete"). Based on the selection of the UI element 904, the mashup installer 104 may be configured to release resources associated with the API mashup on the cloud computing system 102 and the workflow system 112.

Figure 10:
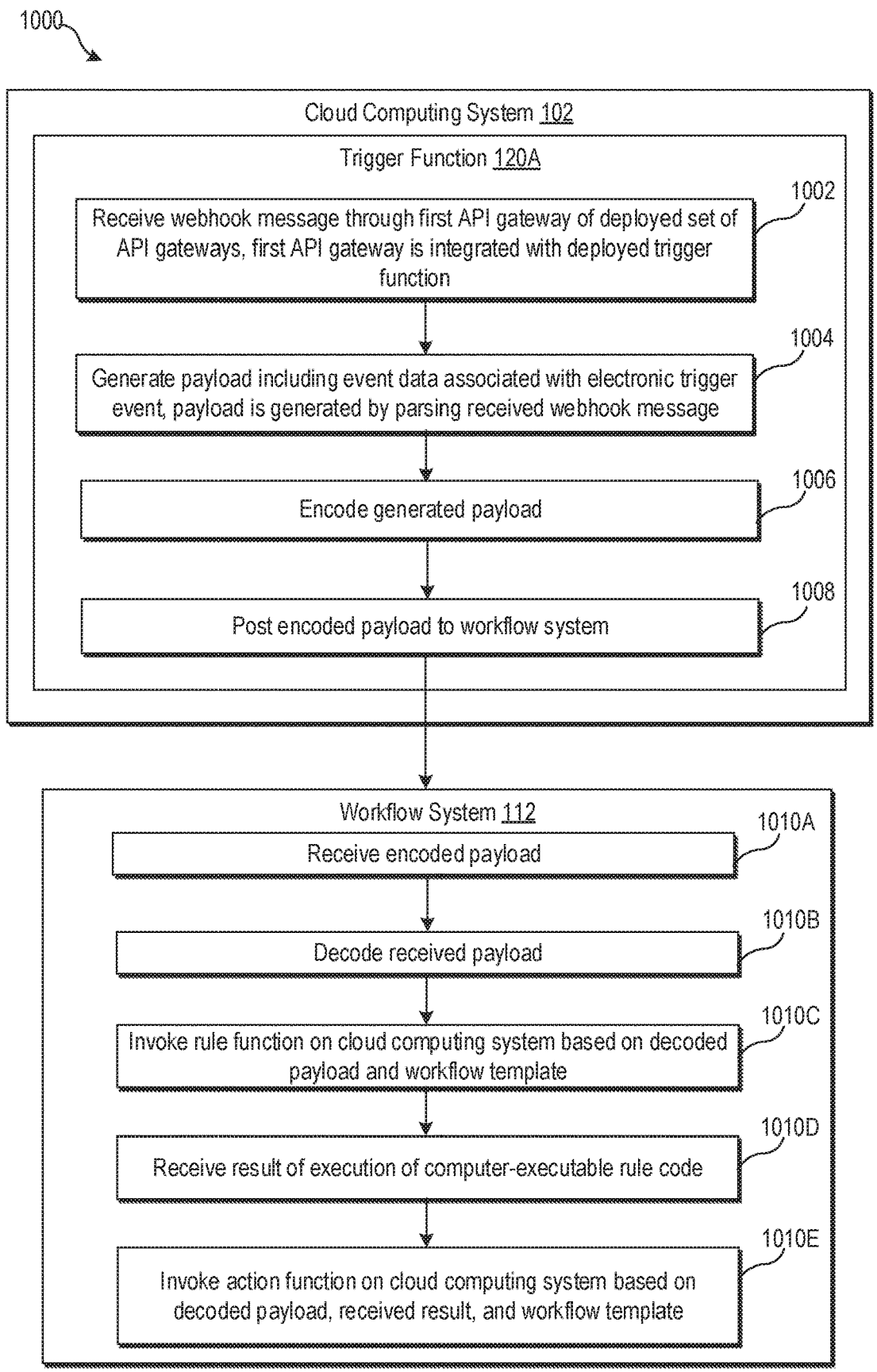
FIG. 10 illustrates a flowchart of an example method for a workflow execution of an API mashup.

FIG. 10 illustrates a flowchart of an example method for a workflow execution of an API mashup, according to at least one embodiment described in the present disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000.

At 1002, a webhook message may be received by the deployed trigger function 120A from the first API provider or a webhook service. The webhook message may be received through the first API gateway 122A of the deployed set of API gateways 122A, 122B, and 122C. In an embodiment, the webhook service may transmit a HTTP POST message, as the webhook message, to the URL of the first API gateway 122A. The first API gateway 122A may be integrated with the deployed trigger function 120A. In this implementation, the trigger function 120A may be deployed as a webhook listener, i.e. a passive listening function on the cloud computing system 102.

At 1004, the trigger function 120A may parse the received webhook message to generate a payload. The trigger function 120A may parse the received webhook message to determine a value of one or more parameters in the received webhook message. The payload may include event data, such as the determined value of each of the one or more parameters. By way of example and not limitation, the trigger function 120A may convert rule and action parameter values to corresponding values (such as to convert {{trigger.key}} to an actual value based on the webhook message).

In some embodiments, the trigger function 120A may generate a dictionary and may store the generated dictionary in the database 118. The dictionary may be a data type that may store data in key-value pairs. The trigger function 120A may generate the dictionary based on the determined values of the one or more parameters. By way of example and not limitation, if a specific user with a user ID "ABC" tweets "Welcome to USA.", then a dictionary may be generated as:

Dictionary={"user ID": "ABC", "Tweet Text": "Welcome to USA."}

Where "user ID" and "Tweet Text" are parameter names, and "ABC" and "Welcome to USA." are corresponding parameter values. In these or other embodiments, the payload may include the generated dictionary.

At 1006, the generated payload may be encoded. By way of example and not limitation, the generated payload may be encoded using a Base64 encoding technique or other encoding techniques.

At 1008, the encoded payload may be posted to the workflow system 112 for a workflow execution of the API mashup. In an embodiment, the trigger function 120A may post, via the first API gateway 122A, the encoded payload to the workflow system 112. Exemplary operations for a control of the workflow execution of the API mashup are described herein from 1010A to 1010E.

At 1010A, the workflow system 112 may receive the posted payload from the trigger function 120A.

At 1010B, the workflow system 112 may decode the received payload. By way of example and not limitation, if the generated payload is encoded using the Base64 encoding technique, the workflow system 112 may execute a Base64 decoding of the received payload.

At 1010C, the workflow system 112 may invoke the deployed rule function 120B on the cloud computing system 102. The workflow system 112 may invoke the deployed rule function 120B based on the decoded payload and the workflow template. Specifically, the workflow system 112 may determine the URL of the second API gateway 122B from the workflow template and may transmit an API call to the second API gateway 122B based on parameter values in the decoded payload. The second API gateway 122B may be associated with the deployed rule function 120B and the API call may include a payload with actual values of parameters, such as a trigger output parameter ({trigger.key}). In an embodiment, the parameters may also include a pattern and an operator for a trigger rule specified in the workflow template. The API call may be transmitted to invoke the deployed rule function 120B with the event data including values from the payload as the input. When invoked, the rule function 120B may be configured to execute the computer-executable rule code on the cloud computing system 102 to determine whether the event data in the payload satisfies at least one trigger rule (i.e. a rule and a pattern).

At 1010D, the workflow system 112 may receive a result of the execution of the computer-executable rule code. The result may provide information on whether the actual values of one or more parameters in the payload satisfies the at least one trigger rule.

At 1010E, the workflow system 112 may invoke the deployed action function 120C on the cloud computing system 102. The workflow system 112 may invoke the deployed action function 120C based on the decoded payload, the received result, and the workflow template. The deployed action function 120C, when invoked, may execute the computer-executable action code on the cloud computing system 102 to generate at least one API call to the second API provider of the set of API providers 110 to perform the action selected via the action menu 306B.

The deployed action function 120C, when invoked, may further receive a response of the second API provider to the generated at least one API call. The response of the second API provider may be associated with a confirmation or a rejection of the action. The deployed action function 120C, when invoked, may further post the response to the workflow system 112. The workflow system 112 may update the response, via an API call, to the electronic UI 108 on the user device 106.

Although the flowchart 1000 is illustrated as discrete operations, such as 1002, 1004, 1006, 1008, 1010A, 1010B, 1010C, 1010D, and 1010E. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store instructions that, in response to being executed, cause a system (such as the cloud computing system 102) to perform operations. The operations may include deploying a trigger function (such as the trigger function 120A) on a cloud computing system (such as the cloud computing system 102) for detecting an electronic trigger event associated with a first Application Programming Interface (API) provider. The operations may further include deploying a rule function (such as the rule function 120B) on the cloud computing system for applying at least one trigger rule on event data associated with the electronic trigger event. The operations may further include deploying an action function (such as the action function 120C) on the cloud computing system for generating at least one API call to a second API provider based on whether the event data satisfies the at least one trigger rule. The operations may further include deploying a set of API gateways (such as the set of API gateways 122A, 122B, and 122C on the cloud computing system for enabling a workflow system (such as the workflow system 112) to invoke at least one of the deployed trigger function, the deployed rule function, and the deployed action function. The operations may further include generating a workflow template of an API mashup on the cloud computing system based on information associated with the deployed set of API gateways and each of the deployed trigger function, the deployed rule function, and the deployed action function and posting the generated workflow template to the workflow system for a workflow execution of the API mashup.

As indicated above, the embodiments described in the present disclosure may include the use of a special purpose or general-purpose computer (e.g., the processor 202A of FIG. 2) including various computer hardware or software modules, as discussed in greater detail below. Further, as indicated above, embodiments described in the present disclosure may be implemented using computer-readable media (e.g., the memory 202B or the persistent data storage 202C of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
  deploying a trigger function on a computing system for detecting an electronic trigger event associated with a first Application Programming Interface (API) provider;
  deploying a rule function on the computing system for applying at least one trigger rule on event data associated with the electronic trigger event;
  deploying an action function on the computing system for generating at least one API call to a second API provider based on whether the event data satisfies the at least one trigger rule;
  deploying a set of API gateways on the computing system for enabling a workflow system to invoke at least one of: the deployed trigger function, the deployed rule function, and the deployed action function;
  generating a workflow template of an API mashup on the computing system based on information associated with the deployed set of API gateways and each of the deployed trigger function, the deployed rule function, and the deployed action function;
  posting the generated workflow template to the workflow system for a workflow execution of the API mashup;
  receiving, by the deployed trigger function, a webhook message through a first API gateway of the deployed set of API gateways, the first API gateway is integrated with the deployed trigger function;
  generating a payload comprising the event data associated with the electronic trigger event, the payload is generated by parsing the received webhook message;
  encoding the generated payload;
  posting the encoded payload to the workflow system; and
  controlling the workflow execution of the API mashup, the controlling comprising:
    receiving, by the workflow system, the posted payload;
    decoding, by the workflow system, the received payload;
    invoking, by the workflow system, the rule function on the computing system based on the decoded payload and the workflow template;
    wherein, when invoked, the rule function is configured to execute a computer-executable rule code on the computing system to determine whether the event data in the decoded payload satisfies the at least one trigger rule.

2. The method according to claim 1, further comprising:
  receiving, from an electronic user interface (UI) of a user device, a first input comprising a selection of an API-based trigger option associated with the first API provider;

receiving, from the electronic UI, a set of trigger parameters associated with the API-based trigger option; and
generating a computer-executable trigger code for detecting the electronic trigger event based on the received first input and the received set of trigger parameters.

3. The method according to claim 2, wherein the deploying the trigger function comprises:
generating a trigger function on the computing system;
configuring the generated trigger function by setting the generated computer-executable trigger code on the computing system as a first function setting of the generated trigger function; and
creating an integration of a first API gateway of the deployed set of API gateways with the configured trigger function.

4. The method according to claim 3, wherein
the deployed trigger function is a webhook listener, and
a Uniform Resource Locator (URL) of the first API gateway is a webhook URL on which a webhook message comprising the event data is received from the first API provider.

5. The method according to claim 3, wherein the deployed trigger function is a polling-based trigger function, which when triggered:
executes the generated computer-executable trigger code to periodically call an API endpoint of the first API provider;
receives a sequence of responses from the API endpoint based on the execution; and
detects the electronic trigger event based on a comparison between a first response in the received sequence of responses and a second response in the received sequence of responses.

6. The method according to claim 1, further comprising:
receiving, from an electronic user interface (UI) of a user device, a second input comprising a selection of the at least one trigger rule;
receiving, from the electronic UI, a set of rule parameters associated with the at least one trigger rule; and
generating a computer-executable rule code based on the received second input and the received set of rule parameters,
wherein, when executed, the generated computer-executable rule code applies the at least one trigger rule on the event data associated with the electronic trigger event.

7. The method according to claim 6, wherein the deploying the rule function comprises:
generating the rule function on the computing system;
configuring the generated rule function by setting the generated computer-executable rule code on the computing system as a first function setting of the generated rule function; and
creating an integration of a second API gateway of the deployed set of API gateways with the configured rule function.

8. The method according to claim 1, further comprising:
receiving, from an electronic user interface (UI) of a user device, a third input comprising a selection of an API-based action associated with the second API provider;
receiving, from the electronic UI, a set of action parameters associated with the API-based action; and
generating a computer-executable action code based on the received third input and the received set of action parameters,
wherein, when executed, the generated computer-executable action code generates the at least one API call to the second API provider based on whether the event data satisfies the at least one trigger rule.

9. The method according to claim 8, wherein the deploying the action function comprises:
generating the action function on the computing system;
configuring the generated action function by setting the generated computer-executable action code on the computing system as a first function setting of the generated action function; and
creating an integration of a third API gateway of the deployed set of API gateways with the configured action function.

10. The method according to claim 1, further comprising storing the information associated with the deployed set of API gateways and each of the deployed trigger function, the deployed rule function, and the deployed action function in a database of the computing system.

11. The method according to claim 10, further comprising:
receiving, from an electronic user interface (UI) of a user device, an API call to setup the API mashup on the workflow system;
retrieving the stored information from the database based on the received API call; and
generating the workflow template further based on a determination that the retrieved information is sufficient to generate the workflow template.

12. The method according to claim 1, wherein the generated workflow template comprises:
a first description comprising a workflow sequence for invoking the deployed trigger function, the deployed rule function, and the deployed action function,
a second description comprising a set of trigger parameters, a set of rule parameters, and a set of action parameters, and
a service tag comprising a provider and a connector for the workflow system, the provider and the connector are mapped to URLs of the deployed set of API gateways.

13. The method according to claim 1, further comprising:
receiving, from an electronic user interface (UI) of a user device, a fourth input comprising an option to delete the API mashup associated with a mashup identifier;
releasing, based on the received fourth input, resources associated with the API mashup on the computing system and the workflow system, the releasing comprising:
deleting the deployed trigger function, the deployed rule function, and the deployed action function; and
deleting the generated workflow template.

14. The method according to claim 1, the controlling the workflow execution of the API mashup further comprising:
receiving, by the workflow system, a result of the execution of the computer-executable rule code; and
invoking, by the workflow system, the action function on the computing system based on the decoded payload, the received result, and the workflow template;
wherein, when invoked, the action function is configured to:
execute a computer-executable action code on the computing system to generate the at least one API call to the second API provider;
receive a response of the second API provider to the generated at least one API call; and
post the response to the workflow system.

15. A non-transitory computer-readable storage medium configured to store instructions that, in response to being executed, causes a computing system to perform operations, the operations comprising:
- deploying a trigger function on the computing system for detecting an electronic trigger event associated with a first Application Programming Interface (API) provider;
- deploying a rule function on the computing system for applying at least one trigger rule on event data associated with the electronic trigger event;
- deploying an action function on the computing system for generating at least one API call to a second API provider based on whether the event data satisfies the at least one trigger rule;
- deploying a set of API gateways on the computing system for enabling a workflow system to invoke at least one of: the deployed trigger function, the deployed rule function, and the deployed action function;
- generating a workflow template of an API mashup on the computing system based on information associated with the deployed set of API gateways and each of the deployed trigger function, the deployed rule function, and the deployed action function;
- posting the generated workflow template to the workflow system for a workflow execution of the API mashup;
- receiving, by the deployed trigger function, a webhook message through a first API gateway of the deployed set of API gateways, the first API gateway is integrated with the deployed trigger function;
- generating a payload comprising the event data associated with the electronic trigger event, the payload is generated by parsing the received webhook message;
- encoding the generated payload;
- posting the encoded payload to the workflow system; and
- controlling the workflow execution of the API mashup, the controlling comprising:
  - receiving, by the workflow system, the posted payload;
  - decoding, by the workflow system, the received payload;
  - invoking, by the workflow system, the rule function on the computing system based on the decoded payload and the workflow template.

16. The non-transitory computer-readable storage medium according to claim 15, wherein the operations further comprises:
- receiving, from an electronic user interface (UI) of a user device, a first input comprising a selection of an API-based trigger option associated with the first API provider;
- receiving, from the electronic UI, a set of trigger parameters associated with the API-based trigger option; and
- generating a computer-executable trigger code for detecting the electronic trigger event based on the received first input and the received set of trigger parameters.

17. The non-transitory computer-readable storage medium according to claim 15, wherein the operations further comprises:
- receiving, from an electronic user interface (UI) of a user device, a second input comprising a selection of the at least one trigger rule;
- receiving, from the electronic UI, a set of rule parameters associated with the at least one trigger rule; and
- generating a computer-executable rule code based on the received second input and the received set of rule parameters,
  - wherein, when executed, the generated computer-executable rule code applies the at least one trigger rule on the event data associated with the electronic trigger event.

18. The non-transitory computer-readable storage medium according to claim 15, wherein the operations further comprises:
- receiving, from an electronic user interface (UI) of a user device, a third input comprising a selection of an API-based action associated with the second API provider;
- receiving, from the electronic UI, a set of action parameters associated with the API-based action; and
- generating a computer-executable action code based on the received third input and the received set of action parameters,
  - wherein, when executed, the generated computer-executable action code generates the at least one API call to the second API provider based on whether the event data satisfies the at least one trigger rule.

19. The non-transitory computer-readable storage medium according to claim 15, wherein the generated workflow template comprises:
- a first description comprising a workflow sequence for invoking the deployed trigger function, the deployed rule function, and the deployed action function,
- a second description comprising a set of trigger parameters, a set of rule parameters, and a set of action parameters, and
- a service tag comprising a provider and a connector for the workflow system, the provider and the connector are mapped to URLs of the deployed set of API gateways.

20. The non-transitory computer-readable storage medium according to claim 15, wherein, when invoked, the rule function is configured to execute a computer-executable rule code on the computing system to determine whether the event data in the decoded payload satisfies the at least one trigger rule; and
- the controlling the workflow execution of the API mashup further including:
  - receiving, by the workflow system, a result of the execution of the computer-executable rule code; and
  - invoking, by the workflow system, the action function on the computing system based on the decoded payload, the received result, and the workflow template;
  - wherein, when invoked, the action function is configured to:
    - execute a computer-executable action code on the computing system to generate the at least one API call to the second API provider;
    - receive a response of the second API provider to the generated at least one API call; and
    - post the response to the workflow system.

* * * * *